(12) United States Patent
Ernst De La Graete

(10) Patent No.: US 12,722,104 B2
(45) Date of Patent: Sep. 1, 2026

(54) PLANT AND METHOD FOR RECYCLING AND FILTERING ROLLING OIL

(71) Applicant: FIVES DMS, Lezennes (FR)

(72) Inventor: Conrad Ernst De La Graete, Seclin (FR)

(73) Assignee: FIVES DMS, Lezennes (FR)

( * ) Notice: Subject to any disclaimer, the term of this patent is extended or adjusted under 35 U.S.C. 154(b) by 381 days.

(21) Appl. No.: 18/567,944

(22) PCT Filed: Jun. 24, 2022

(86) PCT No.: PCT/FR2022/051260
§ 371 (c)(1),
(2) Date: Dec. 7, 2023

(87) PCT Pub. No.: WO2022/269212
PCT Pub. Date: Dec. 29, 2022

(65) Prior Publication Data

US 2024/0278150 A1 Aug. 22, 2024

(30) Foreign Application Priority Data

Jun. 25, 2021 (FR) ...................................... 2106829

(51) Int. Cl.
*B01D 29/11* (2006.01)
*B01D 21/04* (2006.01)
(Continued)

(52) U.S. Cl.
CPC ............ *B01D 29/114* (2013.01); *B01D 21/04* (2013.01); *B01D 21/2455* (2013.01);
(Continued)

(58) Field of Classification Search
CPC .. B01D 29/114; B01D 21/04; B01D 21/2455; B01D 29/52; B01D 29/688;
(Continued)

(56) References Cited

U.S. PATENT DOCUMENTS 5,193,377 A 3/1993 Sendzimir et al.
5,471,859 A 12/1995 Sendzimir et al.
2017/0239596 A1* 8/2017 Sequeira ................ B01D 29/52

FOREIGN PATENT DOCUMENTS

CN 101368662 A 2/2009
CN 103191600 A 7/2013
(Continued)

OTHER PUBLICATIONS

International Search Report issued on Sep. 29, 2022, in corresponding International Application No. PCT/FR2022/051260; 5 pages.
Hydac International, "DekaRheo Back-flushable filter cartridges for rolling oil filtration in stainless steel cold rolling mills", Nov. 21, 2013, Retrieved from the Internet: http://www.hydac.com.br/wp-content/uploads/e7219-0-11-13_dekarheo_web.pdf 8 pages.

*Primary Examiner* — Madeline Gonzalez
(74) *Attorney, Agent, or Firm* — Maier & Maier, PLLC

(57) ABSTRACT

A method for recycling and filtering rolling oil implemented for a rolling mill M requiring a rolling oil nominal flow rate comprised between 4000 l/min and 30000 l/min in an oil recycling and filtering plant having a circuit including, successively, according to the flow direction of the oil: a dirty oil tank, collecting the rolling oils coming from the rolling mill, a filtering system including several oil filtering devices configured to perform an oil filtering in parallel, a clean oil tank from which the rolling mill is fed with rolling oil at the nominal flow rate. The unclogged muds undergo a secondary treatment by continuous and turbulence-free decantation, thanks to a feed-in of the decanter with mud regulated by a pump.

26 Claims, 12 Drawing Sheets

(51) Int. Cl.
*B01D 21/24* (2006.01)
*B01D 29/52* (2006.01)
*B01D 29/68* (2006.01)

(52) U.S. Cl.
CPC .......... *B01D 29/52* (2013.01); *B01D 29/688* (2013.01); *B01D 2201/29* (2013.01)

(58) Field of Classification Search
CPC .... B01D 2201/29; B01D 21/02; B01D 21/30; B01D 21/2461; B01D 2221/14; B01D 29/50; Y02P 70/10; C10M 175/0058
USPC .... 210/333.01, 108, 194, 195.1, 195.3, 196, 210/197, 253, 252, 258, 41, 6.1, 425, 210/275, 513, 528, 534, 540
See application file for complete search history.

(56) References Cited

FOREIGN PATENT DOCUMENTS

| | | | |
|---|---|---|---|
| DE | 29911482 | U1 | 12/1999 |
| FR | 3027528 | A1 | 4/2016 |
| WO | 2016066926 | A1 | 5/2016 |

* cited by examiner

PLANT AND METHOD FOR RECYCLING AND FILTERING ROLLING OIL

The present disclosure relates to a method for recycling and filtering rolling oil implemented for a rolling mill requiring a rolling oil nominal flow rate comprised between 4000 l/min and 30000 l/min, as well as a plant for recycling and filtering rolling oil as such.

FIELD

The field of the invention is that of rolling oil filtering in cold rolling mills, and more particularly "Sendzimir" rolling mills, in particular 20-high rolling mills, known under the name "20-Hi" to those skilled in the art. An example of such a 20-high rolling mill is illustrated in the documents U.S. Pat. Nos. 5,193,377 and 5,471,859. In such a rolling mill, the rolls are divided into a lower group and an upper group, more specifically, these groups have a symmetrical structure and each includes ten rolls including: one working roll, two first intermediate rolls, three second intermediate rolls, and four support rolls or support rollers, which lie outside the arrangement.

In a rolling mill, in particular in a 20-high rolling mill, the rolling operations are performed while projecting oil over the rolls and the strip, and in particular over the working rolls between which the metallic strip is rolled. The rolling operations generate a large amount of metallic particles originating in particular from the frictions between the rolls and the strip, which particles are transferred in the oil stream downstream of the rolling mill.

This lubrication and/or cooling operation is implemented by a filtering and recycling plant which allows recovering the rolling oil loaded with metallic particles, filtering it in order to clear it off the metallic particles in suspension, and then recycling the filtered oil free of metallic particles.

Having high-quality filtered oil free of metallic particles allows rolling the strip with the obtainment of a surface condition featuring a low roughness, reflective or highly-reflective. Otherwise, the particles in suspension in the oil are abrasive for the metallic strip, and increase the roughness of the strip during the rolling operations.

More particularly, the present disclosure focuses on recycling and filtering plants configured to ensure a filtered oil nominal flow rate to the rolling mill comprised between 4000 l/min and 30000 l/min, and in particular between 8000 l/min and 27000 l/min.

BACKGROUND

FIG. 1 discloses the primary filtering system of an oil recycling and filtering plant, known from the state of the art, suited to feed in a 20Hi rolling mill with a filtered oil flow rate of 12000 l/min, whose architecture is described hereinafter, as well as drawbacks thereof.

The plant has a primary filtering circuit, schematically illustrated in FIG. 1 and which comprises, between a dirty oil outlet of the rolling mill and a clean oil inlet, according to the normal flow direction of the oil:

- a dirty oil tank 2',
- a pump system 110' (feed-in of the filtering system),
- a filtering system 100' comprising the filtering devices and pumps,
- a pump system 120' (extraction from the filtering system),
- a clean oil tank 3',
- a pump system 4' (for the rolling mill M'),
- an exchanger system 5',
- a valve system 6'.

In such a circuit, the dirty oil is collected in the dirty oil tank 2', before being transferred, pushed by the pump system 110', into the filtering system 100, filtering throughout the cartridge filtering medium being performed under suction of the pumps 120' downstreams.

Afterwards, the filtered oil is stored in the clean oil tank 3'. The pump 4' and valve 6' system allows feeding in the rolling mill M' according to the nominal flow rate desired for the rolling mill. The exchanger system 5', in particular of the water/oil type, allows setting the temperature of the oil. The illustrated plant is dimensioned so as to ensure a constant fluid flow rate to the rolling mill, typically comprised between 4000 l/min and 27000 l/min, the filtering system 100' comprising a plurality of filtering devices with trays 100' (four in number in FIG. 1), of the type manufactured by SUPAMIC, and known since the 1970s in this type of recycling plants.

As illustrated in FIG. 2A, the filtering device 1' comprises a vat 10', typically cylindrical inside which several removable "trays", denoted 11', 12', 13', 14' and 15', are superimposed distributed along the height of the vat, and stacked on top of one another thanks to feet systems. Each of the trays consists of a hollow element on which a large number of filtering cartridges are fastened in parallel, typically by screwing the upper end of the cartridge on corresponding threaded portions of the tray.

The vat 10' comprises a lower opening for the dirty oil 16', and an overflow opening 17', located above the trays. Filtering is performed throughout the filtering medium of the different cartridges, from outside to inside, oil filtered by the cartridges being collected in each of the trays, which consist of hollow elements, and then conveyed towards an outlet of the tray for clean oil. The oil outlets of the different trays are respectively tightly connected to openings distributed along the height of the vat, thanks to a set of flanges. The different filtered oil outlets 18' meet at the same vertical pipe 19'.

FIG. 2A illustrates such a five-tray filtering device featuring the following characteristics:

| | |
|---|---|
| Number of trays: | 5 |
| Length of the cartridges: | 13 inches (namely 33.02 cm), |
| Number of cartridges: | 4160 (832 cartridges per tray), |
| Height of the device's vat: | 6.1 meters, |
| Effective volume (oil): | 18 $m^{3,}$ |
| Unclogging duration: | 30 min. |

Such a filtering device has a filtering capacity greater than 4000 l/min. The filtering system of a recycling and filtering plant equipping a rolling mill whose oil flow rate is 12000 l/min requires only three devices 1' according to FIG. 3, arranged in parallel and as illustrated in FIG. 3.

As regards filtering and recycling plants intended to cover considerable oil needs, typically from 4000 l/min to 27000 l/min, it is common for those skilled in the art to use filtering devices having a number of superimposed trays comprised between four or five, which allows limiting the number of pumps 120' that are associated to each of the four- or five-tray filtering devices.

Quite often, the used filtering cartridges comprise a nylon- or fiberglass-based filtering medium. In order to extend the service life of the cartridges, back flushable-type filter cartridges are used.

Unclogging of the cartridges is performed at a regular time interval, and is implemented, on the filtering devices with trays, one after another. To this end, a fluid (compressed air) countercurrent is implemented on one of the filtering devices with trays, and while the other filtering devices with trays, disposed in parallel, ensure filtering of the rolling oil. For each device, unclogging is implemented one tray after another, and not simultaneously on all cartridges of the different trays.

Prior to the compressed air countercurrent FL-AIR, the vat of the filter is emptied of dirty oil. Afterwards, the unclogging operation produces oil loaded with particles peeled off the filtering medium of the cartridges, hereinafter referred to as muds, which is evacuated up to a secondary filtering equipment which is described later on. When muds peeled off an upper tray is discharged onto a lower tray, oil could be drawn from a tank to drain the muds out of the vat of the filtering device.

During unclogging operations on one of the filtering devices in parallel, the filtering and recycling operations continue on the other filtering devices in parallel. Nonetheless, the filtering flow rate of the filtering system is reduced by the filtering capacities of one filtering device 1' and no longer allows covering the needs of the rolling mill in terms of filtered oil flow rate.

Also, and throughout the entire duration of unclogging:

- the dirty oil flow rate arriving into the dirty oil tank 2' is higher than the filtered oil flow rate so that the dirty oil level in this tank rises,
- conversely, the flow rate of clean oil sucked in by the pumps 4' from the clean oil tank 3' to cover the need for oil of the rolling mill is higher than the flow rate of oil filtered in parallel by the other filtering devices arriving into the tank 3' so that the oil level of the clean oil tank 3' drops.

The dirty oil tank and the clean oil tank then constitute buffers that are used to compensate for the variations of filtering flow rates during the unclogging operations and in order to avoid having to interrupt the rolling operations.

For a five-tray filtering device, and for which unclogging by countercurrent is performed one tray after another, the unclogging duration is long typically in the range of 30 minutes so that the dirty oil tanks and the dirty oil tank are dimensioned with a considerable size, typically larger than 100 $m^3$ for each one for a rolling mill with a flow rate of 12000 l/min.

Thus, the document CN103191600A describing a filtering and recycling plan equivalent to that described herein as example indicates an effective volume of 130 $m^3$ for the dirty oil tank and of 130 $m^3$ for the clean oil tank.

This makes it necessary to place the high-capacity dirty oil tank 2' and clean oil tank 3' in a dedicated ventilated basement, at a distance from the sand of the rolling mill, since the space in front of the stand of the rolling mill, in the immediate vicinity of the rolling mill, located between the rails of the two coil-carrier devices disposed on either side of the rolling mill stand is largely insufficient to receive tanks with such a capacity.

Unclogging of each filtering device of the primary filtering is scheduled at regular intervals, every eight hours, while keeping a 2-3 hour interval between uncloggings of two filtering devices for the oil level to rise in the clean oil tank, and drop in the dirty oil tank.

During normal operation, when all filtering devices in parallel ensure filtering of the oil, the filtering flow rate of all filtering devices in parallel becomes again higher than the nominal flow rate of rolling mill so as to enable the clean oil level to rise in the clean oil tank, and the dirty oil level to drop in the dirty oil tank. The clean oil tank then comprises an overflow spillway which enables the excess filtered oil to spill out from the clean oil tank and fall into the dirty oil tank.

In order to avoid interruptions of the rolling operations due to an insufficient oil level in the clean oil tank, the document CN103191600A suggests equipping the clean oil tank with a high level sensor, and starting the operations of unclogging the primary filtering only when the high level sensor indicates that the clean oil tank is full.

The filtering and recycling plants according to the state of the art comprise a secondary filtering with a secondary filtering system 200' which allows treating the muds originating from unclogging of the filtering medium of the cartridges of the filtering system 100' of the primary filtering.

Thus, FIG. 4 schematically illustrates the filtering and recycling plant according to the state of the art, including the dirty oil tank and the clean oil tank, the three filtering devices 1 (each with five superimposed trays) of the primary filtering which ensure filtering of the oil drawn from the dirty oil tank 3' by a pump set of the pump system 110' pushing the oil up to the three vats 10', the oil passing through the filtering medium of the five trays before being collected in the pipe within the tray and coming out through the outlet 18', and then being collected in the vertical pipe, the extraction pump 120' associated to each filtering device 1' allowing sucking in the oil that has returned to clean oil tank.

The unclogging operations are performed one filtering device after another by injection of compressed air into the filtering tray, one tray after another. Prior to the operations of injecting air in countercurrent throughout the filtering medium of the cartridges, the vat of the filtering device is emptied into the dirty oil tank, and then it is proceeded with the injection of air in countercurrent throughout the cartridges in order to ensure peeling of the muds off the filtering medium.

Muds peeled off the cartridges by the countercurrent air are recovered at the bottom of the vat and then transferred into a secondary filtering system for treatment thereof.

These muds arrive via the pipe 150' in a decantation unit GC' comprising several decantation vats separated by partitions. In general, the decantation unit GC' comprises several vats separated by partitions, and so as to attenuate the turbulences generated by the sudden arrivals of muds, substantially every two-three hours. The decantation unit GC' comprises a first decantation vat C1', intended to spill out via a spillway into a second decantation vat C2'. The coarsest particles precipitate at the bottom of the vats C1' and C2'.

The coarse particles are drawn in a bottom hopper by a worm screw SCR, and then conveyed by a pump 220' up to a third vat C3' and a fourth vat C'4 for concentrated muds, the particle-concentrated muds being constantly drawn off to be evacuated.

The secondary filtering equipment further comprises decantation vats, and in particular the first vat C1' and the second vat C2', at least one, and possibly several filtering devices 210', 211', and in particular two filtering devices 210', 211' in FIG. 4.

Pumps 203' allow drawing oil at a mid-height of the vats C1', C2' and conveying it into the vat of the filtering devices 210', 211', for filtering thereof throughout the filter medium of the cartridges of filtering devices 210', 211', the filtered oil being conveyed through pipes 212', 213' before returning towards the dirty oil tank 3'.

Overflow spillways TP2' and TP4' are provided at the second vat C2' and at the fourth vat C4' and allow evacuating the overflow towards the dirty oil tank 3', but in this case without passage of the oil through the filtering device(s) 210', 211'.

The cartridges of the secondary filtering devices 210', 211' themselves periodically require unclogging by compressed air countercurrent. When unclogging the cartridges of the secondary filter, the muds are conveyed into a fifth vat C5' which spills out into the third vat C3. The decantate of the fifth vat is drawn by the worm screw SCR' and conveyed by the pump 220 up to the third vat C3'.

The document CN103191600A criticises, in paragraph [13], such a secondary filtering system, and more particularly points out that when the oil level becomes too high in the decantation vats, oil spills directly (via the overflow spillways denoted TP2', TP4' in FIG. 4) up to the dirty oil tank, and therefore without passing through the secondary filtering devices denoted 210', 211', this overflow which is highly contaminated with metallic particles contaminating, in turn, the dirty oil in the dirty oil tank, by a domino effect, and then clogging the cartridges of the primary filtering, thereby causing their premature clogging, with a drop of the filtering flow rate at the origin of a serious failure of the filtering and recycling plant.

FIG. 3 of the document CN103191600A illustrates such a secondary filtering system. Muds originating from unclogging of the filters of the primary filtering reach a transfer vat, comprising a sieve, muds spilling out a spillway being conveyed up to a first vat of a decantation unit with three decantation vats, oil spilling out the first vat towards the second vat, and then from the second one up to the third one. Coarse particles precipitating at the bottom of the vat are drawn off before being conveyed up to two vats for concentrated muds.

A pump (to the right side) allows drawing the oil at mid-height of the second and third decantation vats, up to a secondary filtering device with cartridges. Oil filtered by the cartridges of the secondary filtering device is transferred up to the dirty oil tank.

In order to ensure that all of the oil having transited throughout the three decantation vats of the unit is properly filtered by the filtering device, before being conveyed to the dirty oil tank, in other words to avoid that oil that is highly contaminated with particles spills out into the overflow spillway and is brought up to the dirty oil tank thereby contaminating it, the document CN103191600A suggests proceeding with an unclogging of the primary filtering by countercurrent when the oil level of the second decantation vat (or the third decantation vat) is at mid-height, and equipping the second vat (or the third vat) with a level sensor to this end.

Thus, it is ensured that the decantation vat is half full, namely with a void larger than the amount of mud that reaches it rapidly upon completion of unclogging of the cartridges of the primary filtering, the vat thus allowing containing this arrival without spill-out through the overflow spillways, and while the oil is filtered by the filtering cartridges of the secondary filtering.

As regards the arrangement and filtering devices of the primary filtering, and the decantation vats and filtering devices of the secondary filtering system, the filtering devices according to the state of the art are conventionally cylindrical-shaped and are placed along a first row, one next to another, while the secondary filtering equipment is disposed according to a parallel second row, and as illustrated in FIG. 5. The secondary filtering system comprises the decantation vats, one next to another, both secondary filtering devices being positioned on top of the decantation vats.

According to the observations of the invention, such a recycling and filtering plant known from the state of the art and illustrated in FIGS. 1 to 5 (or taught by CN103191600A) has the following drawbacks of the primary filtering:

1) large volumes for the dirty oil and clean oil tanks in the range of 130 $m^3$ according to CN103191600A,
2) a difficulty to evacuate from the vat the muds unclogged off the upper trays, which cover the lower trays during the unclogging of the primary filtering,
3) unclogging of the filters of the devices of the primary filtering, generates a mud volume in the range of 2 $m^3$ which suddenly leaks into the decantation vats of the secondary filtering and are at the origin of turbulences which disturb the separation by decantation.

Nonetheless, a recycling and filtering plant for a 20-high rolling mill is known from the document WO2016/066926 of the present Applicant, fundamentally modifying the dimensioning of the filtering devices of the primary filtering, so as to reduce the time for unclogging the primary filtering, and thus allowing for a reduction of the size of the tanks in particular the dirty oil ones, and describing a new arrangement of the dirty oil tank, in the vicinity of the rolling mill, enabled by this volume reduction, and not a distance as disclosed in FIG. 3 of the present application.

Still according to the observations of the inventor, such a recycling and filtering plan as known from the state of the art and illustrated in FIGS. 1 to 5, (or taught by CN103191600A) also has the following drawbacks, at the secondary filtering:

1) a poor sedimentation of the metallic particles in the decantation vats, because of the turbulences created in these vats (in particular denoted C1' and C2' in FIG. 4) by the sudden arrivals of muds from the primary filtering at each unclogging (substantially every 2-3 hours), or because of the muds originating from unclogging of the cartridges of the secondary filtering, which are at the origin of turbulences in the decantation vat C5', and then in the vats C3' and C4' by spill-out
2) a shorter service life (less than 1 year) of the filtering cartridges of the secondary filtering of the devices denoted 210' and 211'.
3) as it should be understood from CN103191600.A, in the event of error of the operator, a high risk of pollution of the oil of the dirty oil tank with the oils highly loaded with particles spilling out the overflow TP2', TP4', decantation vats of the secondary filtering, which leaks directly up to the dirty oil tank and then in the primary filtering, and without filtering by the cartridges of the secondary filtering.

SUMMARY

The present disclosure improves the situation.

According to a first aspect, is provided a method for recycling and filtering rolling oil implemented for a rolling mill requiring a rolling oil nominal flow rate comprised between 4000 l/min and 30000 l/min in an oil recycling and filtering plant having a circuit comprising, successively, according to the flow direction of the oil:

a dirty oil tank, collecting the rolling oils coming from the rolling mill a filtering system comprising several oil filtering devices configured to perform filtering of the oil in parallel, each filtering device has a vat receiving a set of filtering cartridges, the vat comprising an inlet for the oil to be filtered and at least one outlet for the filtered oil having passed through a filtering medium of the cartridges, a clean oil tank from which the rolling mill is fed with the rolling oil at the nominal flow rate, and wherein the dirty rolling oils loaded with particles are recovered in the dirty oil tank and a primary filtering of the oil of the dirty oil tank is ensured by making the oil circulate in parallel in the filtering devices, and the filtered oil is collected in the clean oil tank, and wherein back flushable filtering cartridges are used and it is proceeded with an unclogging of the cartridges of a filtering device by implementing a fluid countercurrent, on this filtering device while the other filtering devices, disposed in parallel, ensure filtering of the rolling oil, the unclogging operation generating muds consisting of oil highly loaded with metallic particles and in which method the muds generated by the unclogging operation in a secondary separation system are conveyed, ensuring a separation of the oil and of the particles contained in the muds by decantation, thereby obtaining a particle-concentrated mud which is evacuated, and a particle-free oil is sent back to the dirty oil tank.

Noteworthily, and according to the present disclosure, the secondary separation system by decantation comprises:

a buffer tank configured to collect the muds generated by the operation of unclogging the primary filtering cartridges, a decanter configured to ensure the sedimentation of the particles contained in the muds in a bottom of the decanter, having an inlet for feeding in the muds and an outlet for the decanted oils, a motor-driven regulation device comprising at least one pump configured to feed in according to a monitored flow rate the feed-in inlet of the decanter with the muds of the buffer tank and wherein the muds in the decanter is separated into particles which sediment in the bottom of the decanter and into a particle-free oil which is evacuated through the outlet while ensuring, by said at least one pump, a monitored flow rate of the muds feeding in the decanter so as to guarantee a continuous and turbulence-free decantation in the decanter between said feed-in inlet and said outlet of the decanter, over a duration longer than the duration separating two consecutive operations of unclogging two filtering devices of the primary filtering.

The features set out in the following paragraphs may, optionally, be implemented. They may be implemented independently of each other or in combination with one another:

said decanter has a useful volume between said feed-in inlet and the outlet, with a capacity V, and wherein the feed-in flow rate D is regulated, so that the average decantation time equal to the V/D ratio is longer than 10 hours, for example comprised between 30 hours and 100 hours, such as 60 hours between said inlet and the outlet;

the decanter comprises one single decantation vat extending lengthwise according to a longitudinal direction and wherein said feed-in inlet for the muds is provided at a so-called proximal one amongst the longitudinal ends of the decantation vat, and the outlet at the other so-called distal one of the longitudinal ends;

the decantation vat consists of a vat devoid of any partition transverse to the longitudinal direction between the inlet for the muds and the outlet for the decanted oil;

the vat has a V-shaped section, according to a plane perpendicular to the longitudinal direction, with two walls inclined towards one another converge towards the bottom of the vat;

an immersed motor-driven conveyor is disposed at the bottom of the decantation vat and extends according to the longitudinal direction including scrapers configured to scrap the bottom and bring the sediments at one end where the sediments are drawn off, in particular at the proximal end;

the outlet is a spillway defining the fluid volume in the decantation vat;

each of the filtering devices comprises one or several removable tray(s) in an inner volume of the vat, configured to be removed out of the vat through an upper opening closed by one or several cap(s), each of the trays removably receiving filtering cartridges, each of the hollow trays constituting a collector for the oil filtered by the cartridges of said tray, each of the trays comprising a filtered oil outlet removably connected to a corresponding outlet of the vat via a fitting;

the plant has one single tray or several trays which are then disposed juxtaposed on one single level in the vat, the cartridges hanging downwards, and so that the muds generated by the fluid countercurrent fall directly in the bottom of the vat of the filtering device;

the secondary separation system ensuring the separation of the muds into the concentrated mud and into the metallic particle-free oil is devoid of any filtering devices with cartridges so that the secondary separation is obtained only by decantation;

during unclogging of one of the filtering devices, the other filtering devices with tray(s), disposed in parallel, ensure the filtering of the rolling oil according to a filtering flow rate covering the nominal flow rate of the rolling mill for the rolling operations, the filtered oil flow rate reaching the clean oil tank being always higher than the nominal flow rate that is drawn from the clean oil tank to cool down the rolling mill, even when the filtering flow rate is reduced by one filtering device during unclogging thereof by countercurrent.

According to a second aspect, the present disclosure relates to a plant for recycling and filtering rolling oil having a circuit comprising, successively, according to the flow direction of the oil:

a dirty oil tank, collecting the rolling oils coming from a rolling mill, a filtering system comprising several oil filtering devices configured to perform a filtering of the oil in parallel, each filtering device has a vat receiving a set of filtering cartridges, the vat comprising an inlet for the oil to be filtered and at least one outlet for the filtered oil having passed through a filtering medium of the cartridges, the filtering cartridges being back flushable, a clean oil tank, a system for unclogging the cartridges of the filtering devices configured to implement a fluid countercurrent, on one of the filtering devices, and while the other filtering devices, disposed in parallel, ensure the filtering of the rolling oil, the unclogging operation generating muds consisting of oil highly loaded with metallic particles a secondary separation system, ensuring a separation by decantation of the oil and of the particles contained in the muds thereby obtaining a particle-concentrated mud which is evacuated, and a particle-free oil which is sent to the dirty oil tank.

Noteworthily, and according to the present disclosure, the secondary separation system by decantation comprises:

a buffer tank dimensioned so as to collect the muds generated by the operation of unclogging the primary filtering cartridges, a decanter configured to ensure the sedimentation of the particles contained in the muds in the bottom of the decanter, having an inlet for feeding in the muds and an outlet for the decanted oils, a motor-driven regulation device comprising at least one pump configured to feed in according to a monitored flow rate of said feed-in inlet of the decanter with the muds of the buffer tank, and wherein the secondary separation system is configured to separate the muds in the decanter into particles which sediment in the bottom of the decanter and into a particle-free oil while ensuring, by said at least one pump, a monitored flow rate of the muds feeding in the decanter so as to guarantee a continuous and turbulence-free decantation in the decanter over a duration longer than the duration separating two consecutive operations of unclogging two filtering devices of the primary filtering.

The features set out in the following paragraphs may, optionally, be implemented. They may be implemented independently of each other or in combination with one another:

the decanter comprises one single decantation vat extending lengthwise according to a longitudinal direction and wherein said feed-in inlet for the muds is provided at a so-called proximal one amongst the longitudinal ends of the decantation vat, and the outlet at the other so-called distal one of the longitudinal ends;

the decantation vat is a vat devoid of any partition transverse to the longitudinal direction between the inlet for the muds and the outlet for the decanted oil;

the vat has a V-shaped section, according to a plane perpendicular to the longitudinal direction, with two walls inclined towards one another converging towards the bottom of the decantation vat;

an immersed motor-driven conveyor is disposed at the bottom of the decantation vat and extends according to the longitudinal direction including scrapers configured to scrap the bottom and bring the sediments at one end where the sediments are drawn off, in particular at the proximal end;

the outlet is a spillway defining the fluid volume in the decantation vat of the decanter;

each of the filtering devices comprises one or several removable tray(s) in an inner volume of the vat, configured to be removed out of the vat through an upper opening closed by a cap, each of the tray elements removably receiving filtering cartridges, each of the hollow trays constituting a collector for the oil filtered by the cartridges of said tray, each of the trays comprising a filtered oil outlet removably connected to a corresponding outlet of the vat via a fitting;

the plant has one single tray or several trays which are then disposed juxtaposed on one single level in the vat, the cartridges hanging downwards, and so that the muds generated by the fluid countercurrent fall directly in the bottom of the vat of the filtering device;

the vats of the filtering devices ensuring the primary filtering, and possibly the buffer tank, are arranged above the decanter ensuring the secondary separation;

the vats of the filtering devices, and possibly the buffer tank, are juxtaposed in series above the decantation vat of the decanter along the longitudinal direction of the decantation vat;

the plant having several trays juxtaposed on one single level in the vat and wherein the juxtaposed trays are shifted according to the direction transverse to the decantation vat of the decanter;

the vats of the juxtaposed filtering devices have rectangular sections, according to a horizontal plane, and extend lengthwise according to the direction transverse to the decantation vat of the decanter and widthwise according to the longitudinal direction of the decantation vat of the decanter;

the decantation vat of the decanter comprises, according to the longitudinal direction of the vat, several vat segments welded to one another, and according to a pitch, according to the longitudinal direction of the decantation vat, corresponding to the dimension of a filtering device, according to the longitudinal direction, and possibly to the dimension of the buffer tank according to the longitudinal direction, the segments forming the decantation vat of the secondary separation, on the one hand, and the filtering devices, and possibly the buffer tank superimposed to the segments, being respectively positioned, overlapping one another according to the longitudinal direction;

the vats of the filtering devices, and possibly buffer tank too, are contained within the footprint of the decantation vat of the decanter;

the dirty oil tank is positioned in a basement in the immediate vicinity of the rolling mill, providing access to underneath the stand of the rolling mill and while the filtering devices of the primary filtering system, on the one hand, and the decanter and the buffer tank of the secondary separation system, on the other hand, are located at a higher level.

BRIEF DESCRIPTION OF DRAWINGS

Other features, details and advantages will appear upon reading the detailed description hereinafter, and upon analysing the appended drawings, wherein.

DETAILED DESCRIPTION

Figure 1:
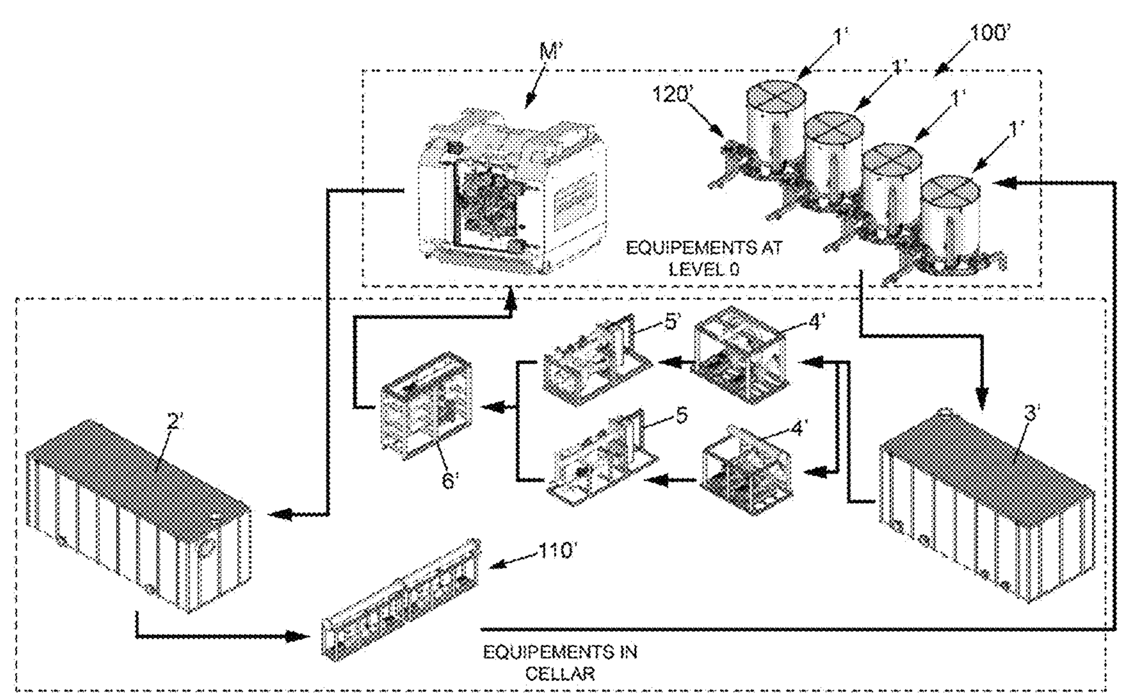
FIG. 1 is a schematic view of an oil filtering and recycling plant of a 20-high rolling mill, as known from the state of the art.

Thus, the present disclosure relates, according to a first aspect, to a method for recycling and filtering rolling oil implemented for a rolling mill M requiring a rolling oil nominal flow rate comprised between 4000 l/min and 30000 l/min, and for example between 8000 l/min and 27000 l/min.

The rolling mill performs cold rolling of the strip and could typically consist of a 20-high rolling mill. Typically, two coil-carriers are provided on either side of the stand of the rolling mill according to the running direction of the strip. The strip could be rolled between the working rolls of the rolling mill, in a first running direction, a first motor-driven coil being unwound, the strip being wound on a second motor-driven coil, then the rolled strip could be rolled in a second running direction, when the second coil is unwound, the rolled strip being wound on the first coil.

The cold rolling operations are performed while sprinkling lubrication oil which is typically directed onto the rolled strip and the working rolls during rolling. The rolling operations consist of operations that generate much metallic particles and the rolling oils exiting the rolling mill are loaded with metallic particles. Hence, it is known to filter the rolling oils in order to clear them off the metallic particles to enable recycling thereof in the rolling mill and conventionally to cool down the oil before using it again as a lubricating and cooling oil in the rolling mill.

To this end, the method is implemented in an oil recycling and filtering plant having a circuit comprising, successively, according to the flow direction of the oil:

- a dirty oil tank 2, collecting the rolling oils coming from the rolling mill M,
- a filtering system 100 comprising several oil filtering devices 1 configured to perform a filtering of the oil in parallel, each filtering device having a vat 10 receiving a set of filtering cartridges, the vat comprising an inlet for oil to be filtered and at least one outlet for the filtered oil having passed through a filtering medium of the cartridges,
- a clean oil tank 3 from which the rolling mill is fed in with rolling oil at the nominal flow rate.

Typically, the dirty oil tank 2 may be located at a lower level than the rolling mill M so that the rolling oil loaded with particles leaks by the gravity into the dirty oil tank.

Figure 7:
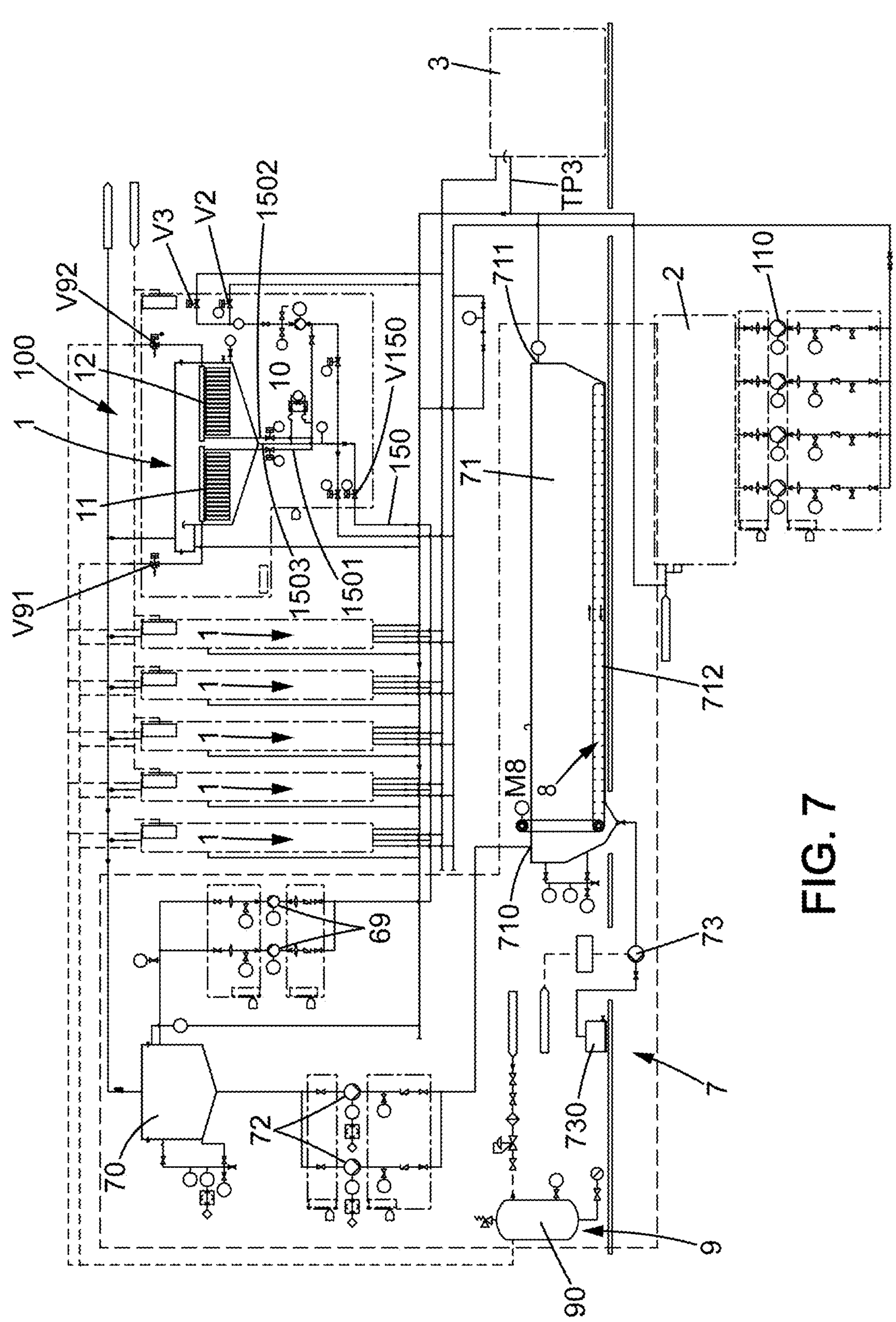
FIG. 7 is a schematic view of the filtering of a filtering and recycling plant according to the present disclosure illustrating at the top, the diagram of the primary filtering comprising six filtering devices, ensuring filtering in parallel, each with two juxtaposed trays, the devices ensuring filtering of the dirty oil originating from the dirty oil tank, the filtered oil being conveyed up to a clean oil tank, the clean oil tank having an overflow spillway in communication with the dirty oil tank, and at the bottom to the right, the diagram of the secondary separation according to the present disclosure, the secondary separation ensuring the treatment of the oils loaded with particles peeled off during the implementation of the compressed air countercurrent, hereinafter referred to as the muds, only by decantation, through a motor-driven regulation of the flow rate of mud reaching the decanter from a buffer tank, the inlet for feeding in the muds being arranged at a proximal end of the decantation vat, the bottom of the decantation vat being continuously scraped to bring the sediments towards the proximal end where the sediments could be drawn off, the decanted particle-free oil being evacuated, through a spillway at the distal end of the decantation vat, and then brought back to the dirty oil tank.
Figure 8:
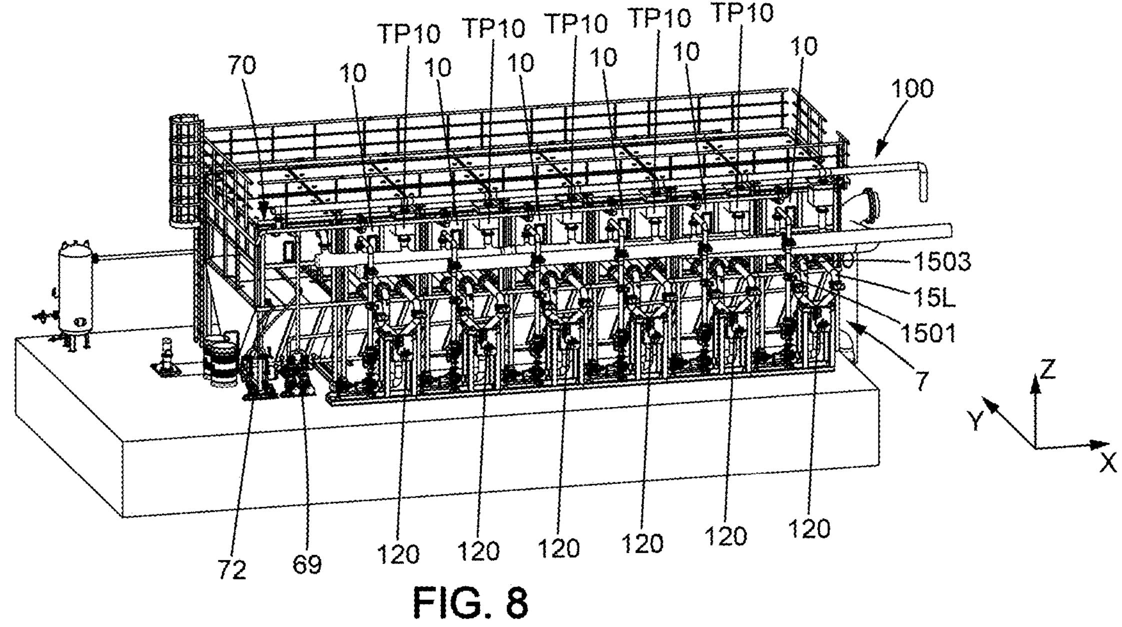
FIG. 8 is a view of an arrangement comprising the decantation vat which extends lengthwise, in which the different filtering devices are superimposed in series, along the length of the decantation vat, as well as the buffer tank, and within a (horizontal) footprint contained within in particular equal to the decantation vat.

In FIG. 7, a pump system 110 which comprises, as example, 4 pumps in parallel, typically at the outlet of the dirty oil tank 2 allows transferring the dirty oil and is configured to push the dirty oil and deliver it in parallel to the different vats of the filtering devices.

According to the method, the dirty rolling oils loaded with particles in the dirty oil tank 2 are recovered and a primary filtering of the oil of the dirty oil tank 2 is ensured by making the oil circulate in parallel in the filtering devices 1, throughout the medium of the filtering cartridges, and the filtered oil is collected in the clean oil tank 3.

Typically, filtering in the vats 10 is done by suction of pump systems 120, downwards, sucking in the filtered oil. The valve V3 enabling the flow of the filtered oil up to the clean oil tank is then opened while the valve V2 is closed. The vats 10 comprise overflow spillways TP10 through which the dirty oil could spill out when the level in the vat 10 is too high. The dirty oil having spilled out then returns to the dirty oil tank 2.

Each of the filtering devices 1 may comprise one or several removable tray(s) 11, 12 in the inner volume of the vat, configured to be removed out of the vat through an upper opening closed by one or several cap(s).

Each of the tray elements 11, 12 removably receives filtering cartridges, each of the hollow trays constituting a collector for the oil filtered by the cartridges of said tray, each of the trays comprising a filtered oil outlet 111, 121 removably connected to a corresponding outlet of the vat 10 via a fitting.

Figure 12:
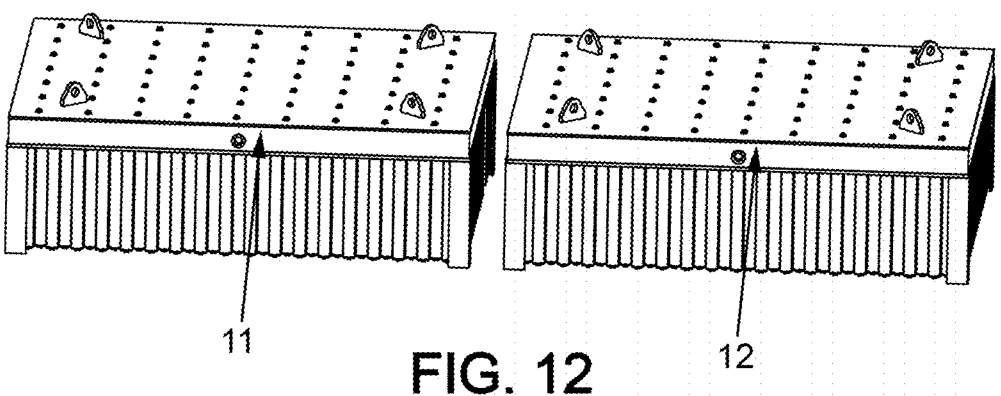
FIG. 12 is a detail view of the two trays, substantially rectangular, from which filtering cartridges are hanging, removably fastened by screwing to the trays, extending in parallel beneath the tray.
Figure 13:
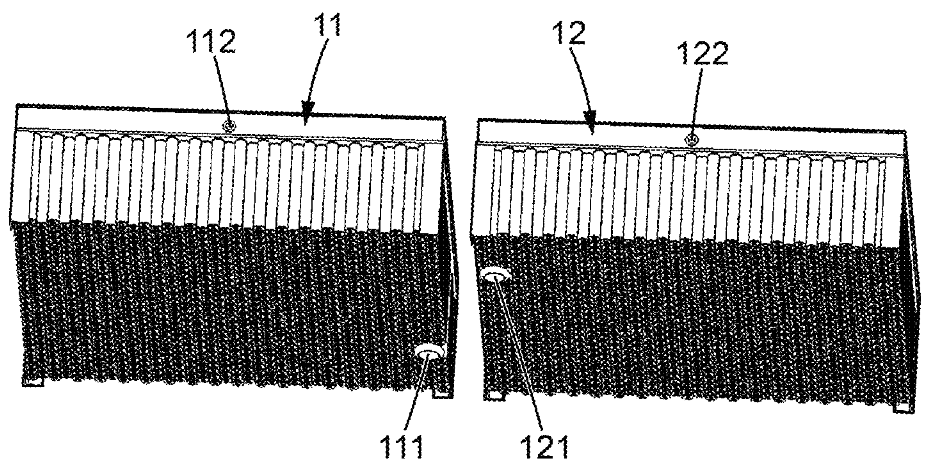
FIG. 13 is a detail bottom view of the two trays, substantially of FIG. 12, illustrating for each filtered oil collecting tray, an outlet in the form of a tubing extending from the tray, vertically and parallel to the filtering cartridges with a mouthpiece located under the lower end of the cartridges.
Figure 14:
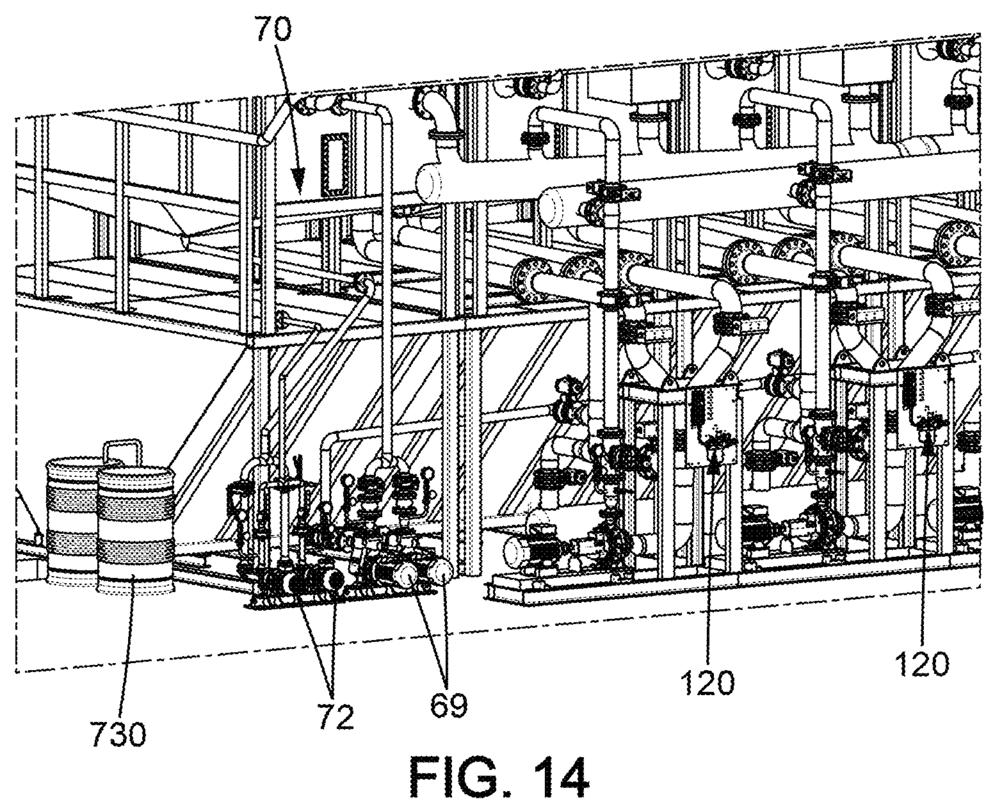
FIG. 14 is a detail view illustrating the proximal end of the vat including the feed-in inlet of the muds, illustrating the pumps for lifting the muds up to the buffer tank, the buffer tank being superimposed to the decantation vat at its proximal end; as well as two motor-driven pumps ensuring feed-in of the inlet of the decantation vat with the muds contained in the tank, and according to a regulated flow rate guaranteeing a continuous turbulence-free decantation in the decantation vat.

Noteworthily, and at least according to one embodiment, the tray(s) are rectangular, as illustrated in FIGS. 12, 13, the cartridges being screwed on a lower face of the tray, over the entire rectangular surface of the tray, the filtering cartridges being vertically juxtaposed next to one another. Typically, each tray is equipped with feet, typically four in number, at the four corners of the rectangle, and as illustrated in FIG. 12. These feet allowing setting the tray over a set-up surface, without the weight of the tray being supported by the cartridges. The tray also has handling ears, at the top thereof and four in number in FIG. 12, which allow extracting the tray and the cartridges hanging from the tray out of the vat, typically by means of a winch when the cartridges must be replaced during maintenance.

As the rolling and filtering operations progress, the filtering medium retains the metallic particles and becomes loaded with particles forming muds on the filtering medium in particular over its outer surface.

Typically, the filtering medium is tubular and cylindrical, filtering of the oil being done from outside to inside, before the filtered oil, inside the cylinder is evacuated from the cartridge and leaks into the inner cavity of the tray 11 or 12.

Filtering cartridges that are back flushable are used, and it is proceeded with an unclogging of the cartridges, typically at a regular time interval. The unclogging operation is implemented, on the filtering devices 1, one at once. A fluid countercurrent, typically compressed air, is implemented on one of the filtering devices, while the other filtering devices, disposed in parallel, ensure filtering of the rolling oil.

A filtering flow rate is maintained by the other filtering devices, to ensure continuity of the rolling operations for which the rolling mill is always cooled down at the nominal flow rate and, where appropriate, using the dirty oil tank and the clean oil tank as buffer tanks, and as described in the state of the art. In such an embodiment, the oil level in the clean oil tank might decrease, when the filtering flow rate is reduced by the capacities of one filtering device and during the operations of unclogging this filter, the dirty oil level then rising.

Nonetheless, and according to an advantageous embodiment different from the state of the art mentioned in the introduction, during unclogging of one of the filtering devices 1 of the primary filtering system, the other filtering devices with tray(s), disposed in parallel, may be configured so as to ensure filtering of the rolling oil according to a filtering flow rate covering the nominal flow rate of the rolling mill for the rolling operations.

In such an embodiment, an additional filtering device 1 in addition to the number that is normally required to cover the needs of the rolling mill in terms of nominal flow rate is intentionally provided. In other words, and during the filtering and recycling process, the filtered oil flow rate reaching the clean oil tank is always higher than the nominal flow rate that is drawn to cool down the rolling mill, even when the filtering flow rate is reduced by one filtering device during unclogging thereof by countercurrent. In FIG. 7, it should be understood that in operation, during filtering, the clean oil tank constantly spills out the overflow spillway TP3, the clean oil that has spilled out the clean oil tank 2 returning to the dirty oil tank, typically by gravity.

Thus, the filtering and recycling plant comprises a system for unclogging 9 the cartridges of the filtering devices 1 configured to implement a fluid countercurrent.

Such an unclogging system 9 typically comprises a compressed air supply 90, and a compressed air piping set which allows blowing in compressed air in countercurrent, into the filtering cartridges, directly in the vats 10, and without having to remove the cartridges or the trays, and as shown in FIG. 7.

Still in FIG. 7, notice that the filtering device 1 has two trays, and that two valves V91, V92 are provided on the compressed air circuit. When the valve V91 is open and the valve V92 is closed, only the cartridges of the first tray 11 are unclogged, and when the valve V91 is closed and the valve V92 is open, only the cartridges of the second tray 12 are unclogged. To this end, each tray 11 or 12 is equipped with a compressed air inlet 112, 122 and as shown in FIG. 12.

Thus, the fluid countercurrent is implemented on one of the filtering devices with trays, the fluid countercurrent being preferably implemented one tray after another, and while the other filtering devices 1 disposed in parallel, ensure filtering of the rolling oil, the unclogging operation generating muds consisting of oil highly loaded with metallic particles peeled off the filtering cartridges of the primary filtering.

Figure 2:
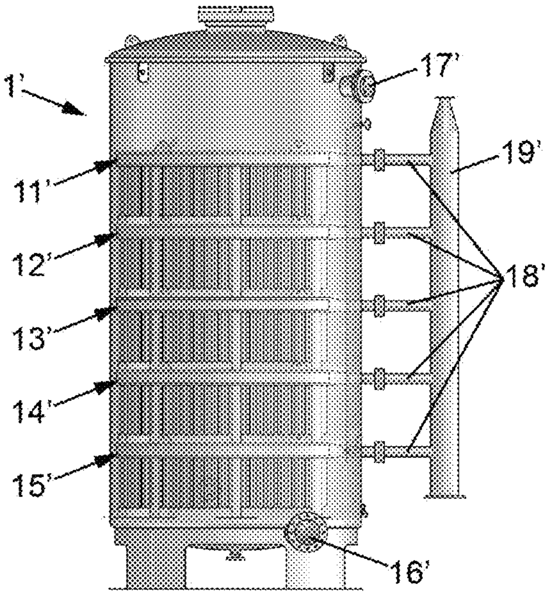
FIG. 2A is a view of a five-tray filtering device, as known from the state of the art.
FIG. 2B is a view of a five-tray filtering device, as known from the state of the art.
Figure 2B:
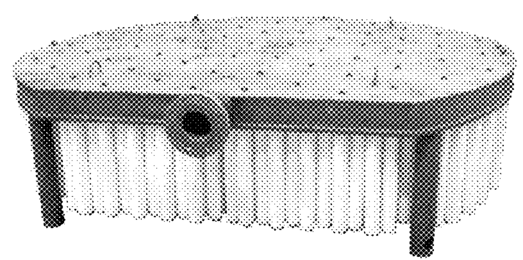
Figure 3:
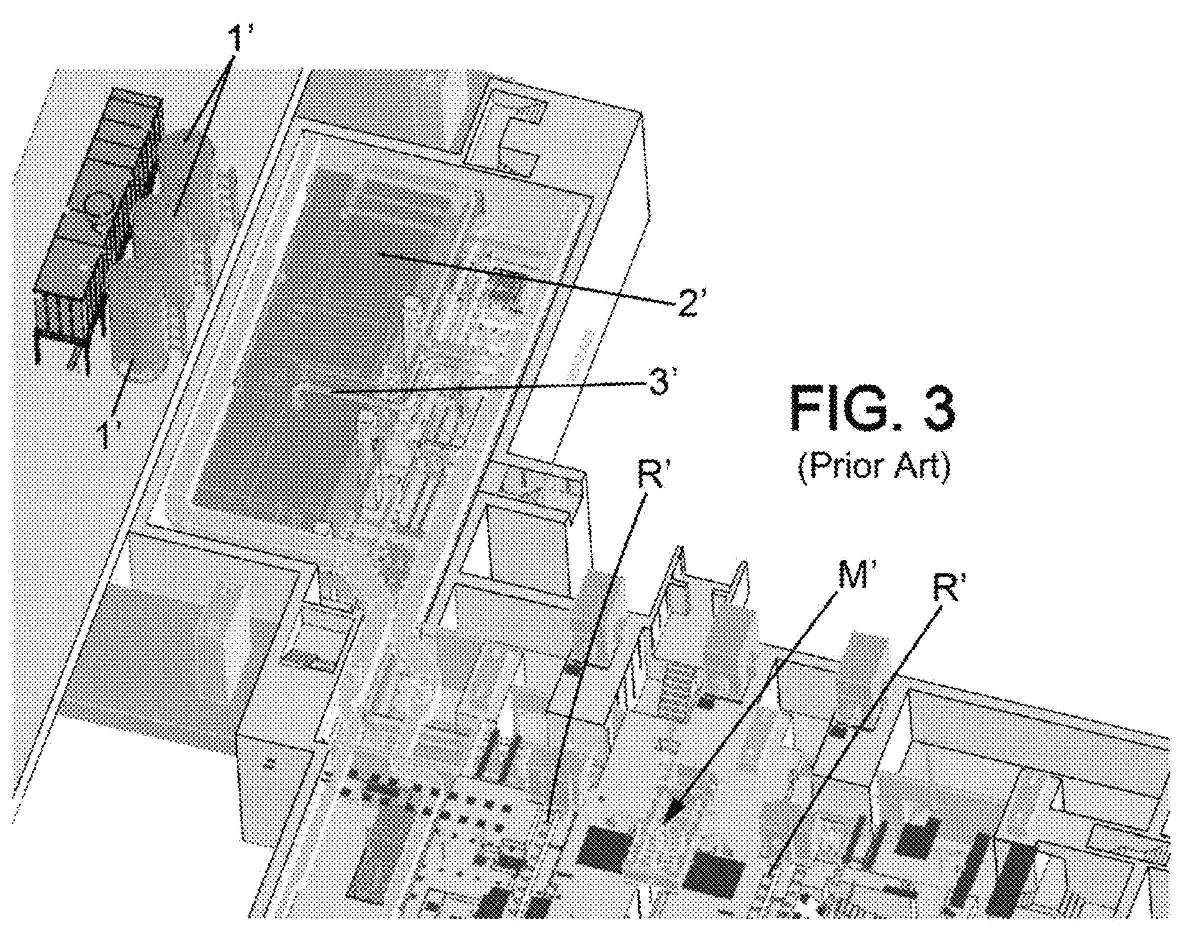
FIG. 3 is a view of the floor layout of the equipment of a recycling plant according to the state of the art.

According to an advantageous embodiment, the tray(s) is/are disposed on one single level, juxtaposed next to one another, as illustrated for the first tray 11 and the second tray 12 in FIG. 7 which are coplanar, the cartridges hanging downwards, and so that the muds generated by the fluid countercurrent fall directly in the bottom of the vat 1 of the filtering device 1. In other words, the defect encountered in the state of the art illustrated in FIG. 2A, and comprising several superimposed trays 11' to 15' for each vat 10' of the filtering device, is avoided, namely that the muds unclogged by countercurrent off an upper tray are difficult to evacuate as they scatter on a lower tray, without falling directly in the bottom of the vat comprising the drain enabling the evacuation of the muds.

It should be noted that the operation of unclogging by fluid countercurrent is performed after having emptied the vat of its dirty oil. To this end, the pump 120 is used, while closing the valve V3 and while opening the valve V2, thereby enabling emptying of the dirty oil of the vat 10 into the dirty oil tank 2.

The unclogging operation generates muds consisting of oil highly loaded with metallic particles which are recovered at the bottom of the vats 10. These muds are transferred through a pipe 150, when the valve V150 is open up to a secondary separation system 7 which ensures a separation of the oil and of the particles contained in the muds by decantation, thereby obtaining a particle-concentrated mud which is evacuated, and a particle-free oil is preferably sent back to the dirty oil tank 2.

According to the present disclosure, and advantageously, the secondary separation system 7 by decantation comprises:

- a buffer tank 70 configured to collect the muds generated by the operation of unclogging the primary filtering cartridges,
- a decanter 71 configured to ensure the sedimentation of the particles contained in the muds in a bottom 712 of the decanter, having an inlet for feeding in 710 the muds and an outlet 711 for the decanted oils, free of metallic particles,
- a motor-driven regulation device comprising at least one pump 72 (motor-driven, for example a screw pump) configured to feed in according to a monitored flow rate the feed-in inlet 710 of the decanter 71 with the muds of the buffer tank 70.

In FIG. 7, notice that the muds generated by the unclogging operations and collected in turn in the different vats of the filtering devices are transferred by a pump system 69, enabling in particular lifting thereof up to the buffer tank 70.

The capacity of the dirty oil tank 70 is intended to receive the content of the muds derived from unclogging of several filtering devices.

According to the method, the muds in the decanter 71 are separated into particles which sediment in the bottom 712 of the decanter 71 and into a particle-free oil which is evacuated through the outlet 711 while ensuring a monitored flow rate, by said at least one pump 72, of the muds feeding the decanter so as to guarantee a continuous and turbulence-free decantation in the decanter 71 between said feed-in inlet 710 and said outlet 711 of the decanter.

Advantageously, the continuous and turbulence-free decantation spans over a duration longer than the duration separating two consecutive operations of unclogging the two filtering devices of the primary filtering, and in contrast with the aforementioned state of the art for which at each unclogging of a filtering device, the unloaded muds disturb the decantation operations in the decanter.

According to an advantageous embodiment, said decanter having a useful volume between said feed-in inlet 710 and the outlet 711, with a capacity V, the feed-in flow rate D is regulated so that the average decantation time equal to the V/D ratio is longer than 10 hours, for example comprised between 30 hours and 100 hours, such as 60 hours between said inlet 710 and the outlet 711.

The effective turbulence-free decantation duration according to the present disclosure, longer than 10 hours, for example 60 hours is much longer than the effective (turbulence-free) decantation duration which is at most 2-3 hours in the state of the art because of the turbulences created by the mud arrivals.

The quality of the unloaded oil coming out through the outlet 711 of the decanter is substantially better than that which could be obtained by the decantation alone according to the aforementioned state of the art for which the effective decantation duration never exceeds the duration between two uncloggings of the primary filtering, namely 2-3 hours at most.

Figure 4:
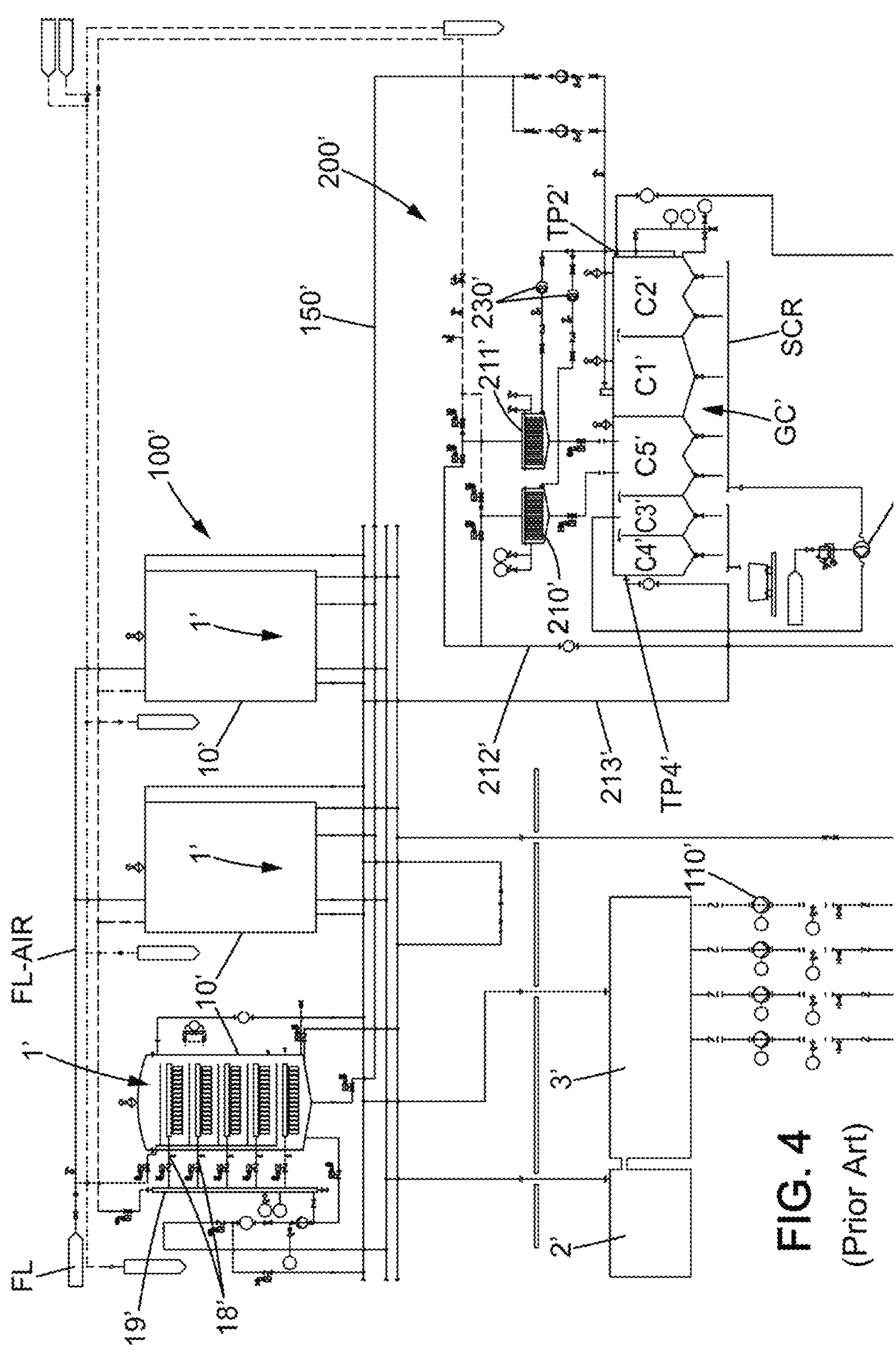
FIG. 4 is a schematic view of filtering of a filtering and recycling plant according to the state of the art illustrating the diagram of the primary filtering comprising three filtering devices in parallel (with five trays), ensuring filtering of the dirty oil coming from the dirty oil tank, the filtered oil being conveyed up to a clean oil tank, the clean oil tank having an overflow spillway in communication with the dirty oil tank, and at the bottom to the right, the diagram of the secondary filtering as known from the state of the art, the secondary filtering ensuring the treatment of the oils loaded with particles peeled off the cartridges during the implementation of the compressed air countercurrent, hereinafter referred to as the muds, the secondary filtering comprising a set of decantation vats separated by partitions, as well as two filtering devices each comprising a vat and a tray provided with filtering cartridges.
Figure 5:
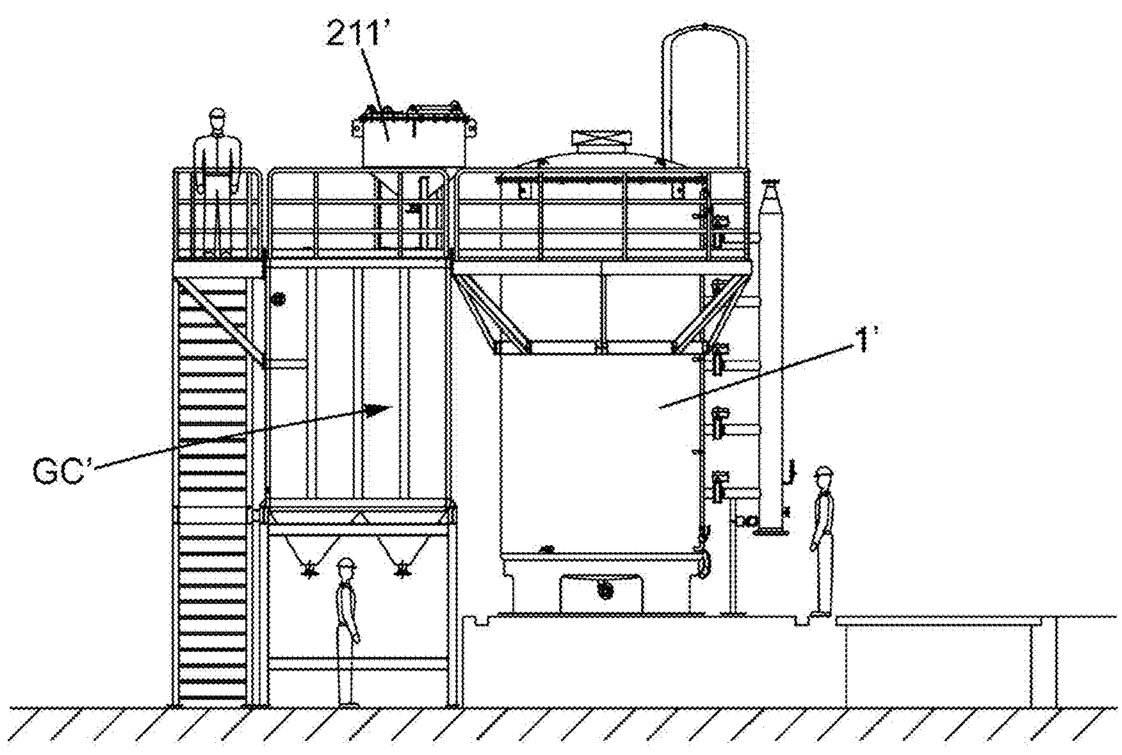
FIG. 5 is a side view of the arrangement of the vats of the primary filtering disposed according to a first row, and the secondary filtering disposed according to a second row, and according to the known arrangement of the state of the art.
Figure 6:
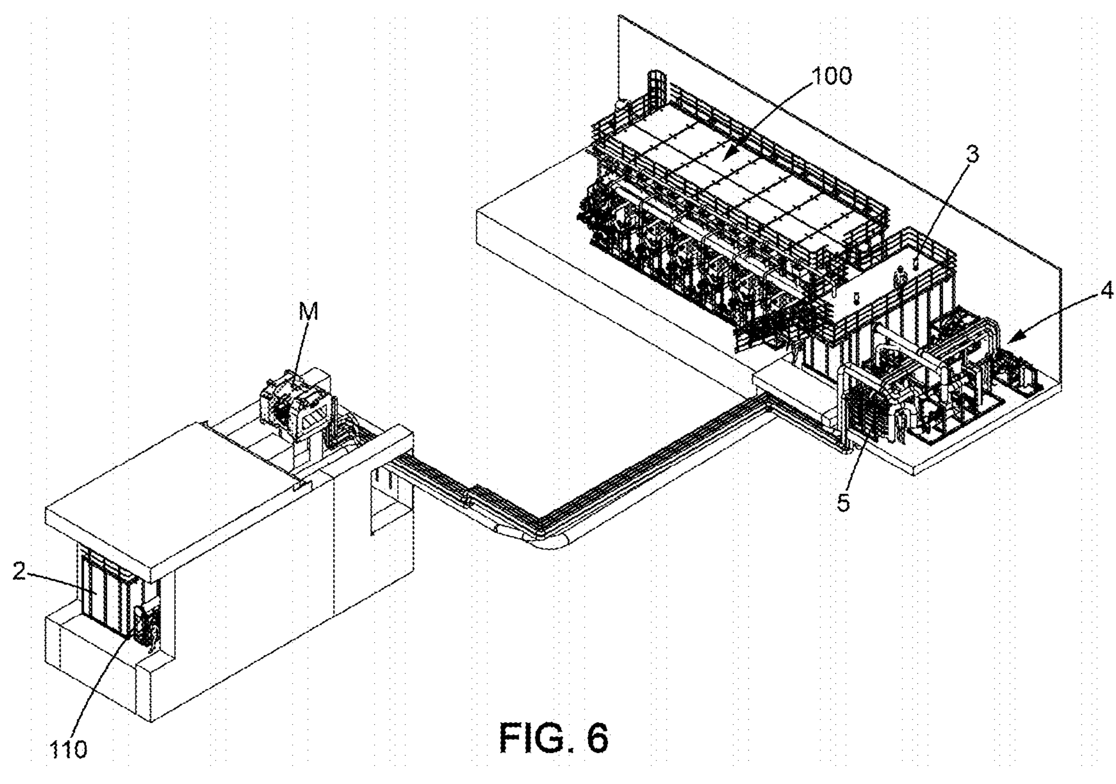
FIG. 6 is an overview of a possible arrangement of a filtering and recycling plant according to the present disclosure.

Still according to an advantageous embodiment, the secondary separation system 7 ensuring the separation of the muds into the concentrated mud and into the metallic particle-free oil is devoid of any filtering device with cartridges so that the secondary separation is obtained only by decantation, and in contrast with the state of the art illustrated in FIG. 4 which comprises filtering devices 210', 211', in series with the decantation vats 210', 211'.

Such filtering devices 210', 211' are no longer necessary, and the drawbacks generated by these devices 210', 211', namely a frequent replacement of the cartridges and the implementation of unclogging operations for these secondary filters which, in turn, generate disturbances and turbulences in the decantation vats, are suppressed.

Figure 10:
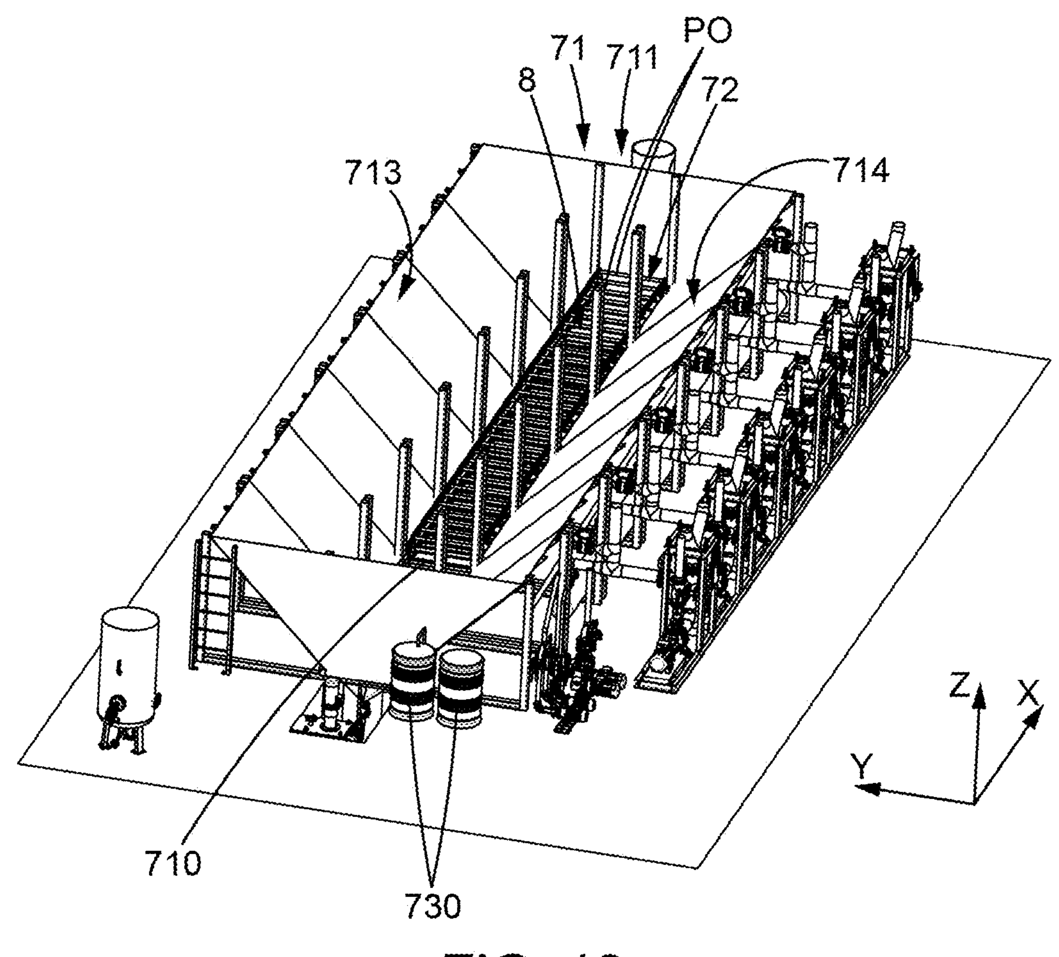
FIG. 10 is a sectional view according to a horizontal plane, illustrating the decantation vat of the decanter, which is devoid of any transverse partition between said proximal end at which the feed-in inlet for the muds is provided, and the distal end at which the outlet for the decanted oil free of metallic particles is provided.

According to one embodiment, and as it should be understood from the sectional view of FIG. 10, the decanter 71 comprises one single decantation vat extending lengthwise according to a longitudinal direction X. Said feed-in inlet 710 for the muds is provided at a so-called proximal one amongst the longitudinal ends of the decantation vat, and the outlet 711 at the other so-called distal one of the longitudinal ends.

According to one embodiment, as shown in FIG. 10, the decantation vat may consist of a vat devoid of any partition transverse to the longitudinal direction between the inlet 710 for the muds and the outlet for the decanted oil 711. Given the regulation device which ensures a low flow rate of the muds, without turbulences in the vat, such partitions are no longer necessary.

Notice that the vat may have a V-shaped section, according to a plane perpendicular to the longitudinal direction, with two walls 713, 714 inclined towards one another converging towards the bottom 712 of the vat.

The motor-driven conveyor 8, immersed in the decantation vat, may be disposed at the bottom of the decantation vat and extends according to the longitudinal direction X.

This conveyor includes scrapers 80 configured to scrap the bottom of the decantation vat and bring the sediments at one end where the sediments are drawn off, in particular at the proximal end. This conveyor may comprise two belts (or two chains), mounted in parallel and directed according to the longitudinal direction X. The scrapers 80 are spaced apart and distributed, along the pair of belts (or chains). Each is subjected by its ends to both belts (or to both chains), by stretching according to the transverse direction. A motor M8 drives a pair of drive wheels which ensures driving, preferably continuous driving, of the belts (or of the chains), and at a very low speed, typically lower than 1 m/day so as to avoid any turbulence and not disturb the sedimentations of the particles in the bottom.

The particles pushed to the proximal end are drawn off by a pump 73, and conveyed up to a container for the concentrated muds. Preferably, the feed-in outlet 711 consists of a spillway setting the fluid volume in the decantation vat.

In general, and given the effective duration of decantation (without turbulence), we notice that the oil coming out of the decantation outlet 711 is sufficiently loaded with metallic particles to be sent to the dirty oil tank, without any additional filtering, and without any risk of degradation of the filtering cartridges of the primary filtering, and in contrast with the aforementioned state of the art.

The present disclosure also relates to a plant for recycling and filtering rolling oil having a circuit comprising, successively, according to the flow direction of the oil:

- a dirty oil tank 2, collecting the rolling oils coming from a rolling mill,

- a filtering system 100 comprising several oil filtering devices 1 configured to perform a filtering of the oil in parallel, each filtering device having a vat 10 receiving a set of filtering cartridges, the vat comprising an inlet for the oil to be filtered and at least one outlet for the filtered oil having passed through a filtering medium of the cartridges, the filtering cartridges being back flushable,
- a clean oil tank 3,
- a system for unclogging the cartridges of the filtering devices 1 configured to implement a fluid countercurrent, on one of the filtering devices, and while the other filtering devices, disposed in parallel, ensure the filtering of the rolling oil, the unclogging operation generating muds consisting of oil highly loaded with metallic particles
- a secondary separation system 7, ensuring a separation by decantation of the oil and of the particles contained in the muds thereby obtaining a particle-concentrated mud which is evacuated, and a particle-free oil which is sent to the dirty oil tank 2.

According to the present disclosure, the secondary separation system 7 by decantation comprises:

- a buffer tank 70 dimensioned so as to collect the muds generated by the operation of unclogging the primary filtering cartridges,
- a decanter 71 configured to ensure the sedimentation of the particles contained in the muds in the bottom of the decanter, having an inlet for feeding in 710 the muds and an outlet 711 for the decanted oils,
- a motor-driven regulation device comprising at least one pump 72 configured to feed in according to a monitored flow rate the feed-in inlet 710 of the decanter 71 with the muds of the buffer tank.

The secondary separation system 7 is configured to separate the muds in the decanter into particles which sediment in the bottom of the decanter and into a particle-free oil while ensuring (by said at least one pump 72) a monitored flow rate of the muds feeding in the decanter so as to guarantee a continuous and turbulence-free decantation in the decanter 71 over a duration longer than the duration separating two consecutive operations of unclogging two filtering devices of the primary filtering.

The plant according to the present disclosure may have the described operation of the plant described before in connection with the implementation of the filtering and recycling method, and in particular.

According to the present disclosure, the decanter may comprise one single decantation vat extending lengthwise according to a longitudinal direction and wherein said feed-in inlet 710 for the muds is provided at a so-called proximal one amongst the longitudinal ends of the decantation vat, the outlet 711 at the other so-called distal one of the longitudinal ends.

The decantation vat may be devoid of any partition transverse to the longitudinal direction X between the inlet 710 for the muds and the outlet 711 for the decanted oil. In particular, the vat may have a V-shaped section, according to a plane perpendicular to the longitudinal direction, with two walls 713, 714 inclined towards one another converge towards the bottom 72 of the decantation vat.

An immersed motor-driven conveyor 8 may be disposed at the bottom of the decantation vat and extends according to the longitudinal direction X including scrapers 80 configured to scrap the bottom of the decantation vat and bring the sediments at one end where the sediments are drawn, in particular the proximal end. The outlet 711 may consist of a spillway defining the fluid volume in the decantation vat of the decanter 71.

Each of the filtering devices 1 comprises one or several removable tray(s) 11, 12 in the inner volume of the vat, configured to be removed out of the vat through an upper opening closed by a cap, each of the trays removably receiving filtering cartridges, each of the hollow trays constituting a collector for the oil filtered by the cartridges of said tray, each of the trays comprising a filtered oil outlet 111, 121 removably connected to a corresponding outlet of the vat via a fitting.

The tray may be unique in the vat 10. Alternatively, the vat 10 may receive several trays 11, 12 which could advantageously be disposed next to one another on one single level, the cartridges hanging downwards, and so that the muds generated by the fluid countercurrent fall directly in the bottom of the vat 10 of the filtering device 1. In particular, the number of trays 11, 12 per filtering device 1 may be equal to two, the trays juxtaposed on the same level, and possibly a number greater than three, or four juxtaposed trays.

Figure 9:
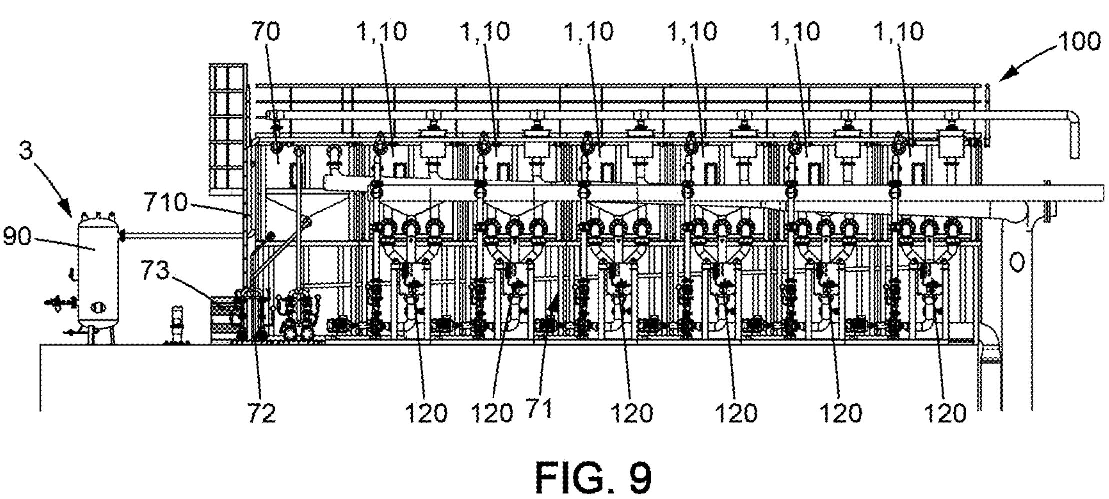
FIG. 9 is a detail view of FIG. 8.
Figure 15:
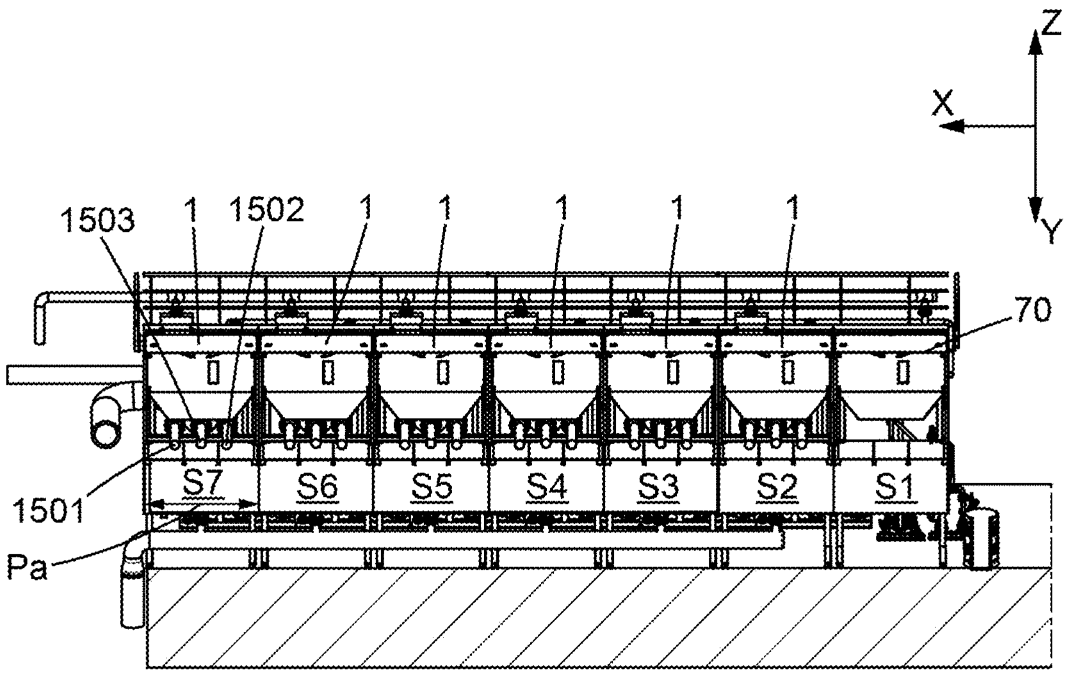
FIG. 15 is a sectional view according to a vertical plane parallel to the longitudinal axis of the decantation vat, and illustrating the modularity of the set, the segmented vat being composed by segments welded to one after another, having a pitch corresponding to the dimension of each of the filtering devices according to the longitudinal direction, as well as the dimension of the buffer tank, thereby facilitating transport and assembly by marine container.

Still according to an advantageous feature of the arrangement comprising the decantation vat and the filtering devices 1 of the filtering system shown in FIGS. 9, 10 and 15 in particular, the vats 10 of the filtering devices 1 ensuring the primary filtering, and possibly the buffer tank 70 may be arranged above the decanter 71 ensuring the secondary separation, and in particular above the decantation vat of the decanter.

In particular, the vats 10 of the filtering devices 1, and possibly the buffer tank 70, are disposed juxtaposed in series above the decantation vat of the decanter 71, in series along the longitudinal direction X of the decantation vat, and therefore on the same level.

The vats 10 of the juxtaposed filtering devices have rectangular sections, according to a horizontal plane, extend lengthwise according to the direction transverse Y to the decantation vat of the decanter and widthwise according to the longitudinal direction X of the decantation vat of the decanter 71.

Figure 11:
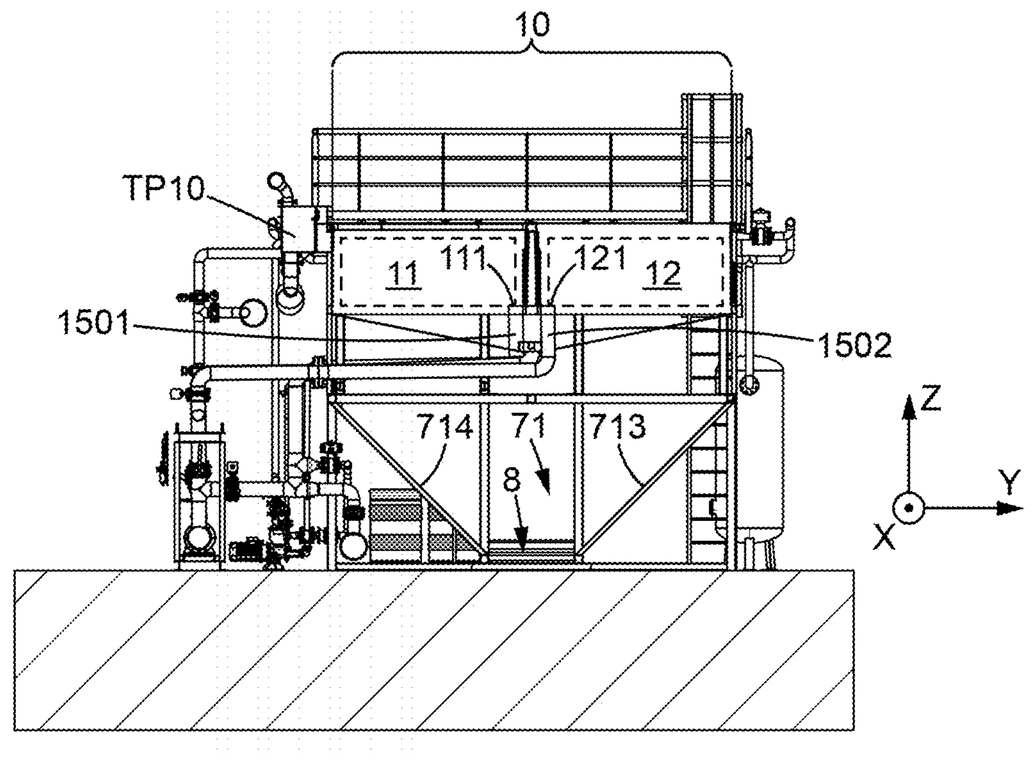
FIG. 11 is a sectional view according to a vertical plane, illustrating the superimposition of the vat of a filtering device, according to the direction transverse Y to the decantation vat, the vat of the filtering device, substantially parallelepiped shaped, extending lengthwise according to the transverse direction Y, and according to a footprint equal to the footprint of the vat according to this transverse direction Y, the vat receiving two filtered oil collecting trays from which filtering cartridges are removably hanging, typically screwed to the tray.

In such a case, the vat 1 of each filtering device 1 receives several trays (such as two trays, with a first tray 11 and a second tray 12) the trays are then shifted according to the transverse direction Y, as illustrated in FIG. 11. The trays, in particular the first tray 11 and the second tray 12 may have a rectangular section so as to better fit within the vat 10, also with a rectangular section. The filtered oil collected by the first tray 11 comes out through a tubing projecting under the tray 110 terminating in the outlet 111, located beneath the filtering cartridges fastened on the lower face of the tray. The filtered oil collected by the second tray 11 comes out through a tubing projecting under the tray 110 terminating in the outlet 121, located beneath the filtering cartridges fastened on the lower face of the tray.

These outlets 111, 121 of the trays are connected to fittings in the bottom of the vat, ensuring the exit of the filtered oil through two pipes in parallel 1501, 1502 projecting beneath the vat 10, which extend laterally between an interspace between the vat of the filtering device 11, at the top, and the decantation vat of the decanter 71, at the bottom.

During the filtering, the dirty oil comes into the vat through the pipe 1503, which opens into the bottom of the vat. This pipe 1503 also enables the evacuation of the muds out of the vat 10 during unclogging.

According to an advantageous embodiment illustrated in FIG. 15, the decantation vat of the decanter 71 comprises, according to the longitudinal direction X of the vat, several vat segments S1, S2, S3, S4, S5, S6, S7 welded to one another, and according to a pitch (denoted Pa in FIG. 15), according to the longitudinal direction of the decantation vat, corresponding to the dimension of a filtering device 1, according to the longitudinal direction X, and possibly to the dimension of the buffer tank 70 according to the longitudinal direction.

The segments S1, S2, S3, S4, S5, S6, S7 forming the decantation vat of the secondary separation, on the one hand, and the filtering devices 1, and possibly the buffer tank, superimposed to the segments, on the other hand, could be respectively positioned, overlapping one another according to the longitudinal direction.

For example, in FIG. 15:

- the first segment S1 of the decantation vat, having the same footprint according to the X direction, and possibly preferably according to the transverse direction Y, as the buffer tank 70 positioned on top of and overlapping this first segment S1,
- the second segment S2 of the decantation vat, having the same footprint according to the X direction, and possibly preferably according to the transverse direction Y, as the first filtering device 1 positioned on top of and overlapping this first segment S2, and so on up to the seventh segment S7, that is to say the seventh segment S7 of the decantation vat has the same footprint according to the X direction, and possibly also preferably according to the transverse direction Y, as the sixth filtering device 1 positioned on top of and overlapping this seventh segment S7.

Depending on the needs in terms of nominal flow rate of the rolling mill, it is possible to address them by modifying the corresponding number of segments and filtering devices, the filtering vat and the segments being dimensioned so as to enable transport thereof by marine container.

Notice that the vats 10 of the filtering devices 1, and possibly the buffer tank 70 too, are contained within the footprint of the decantation vat of the decanter 71.

Figure 16:
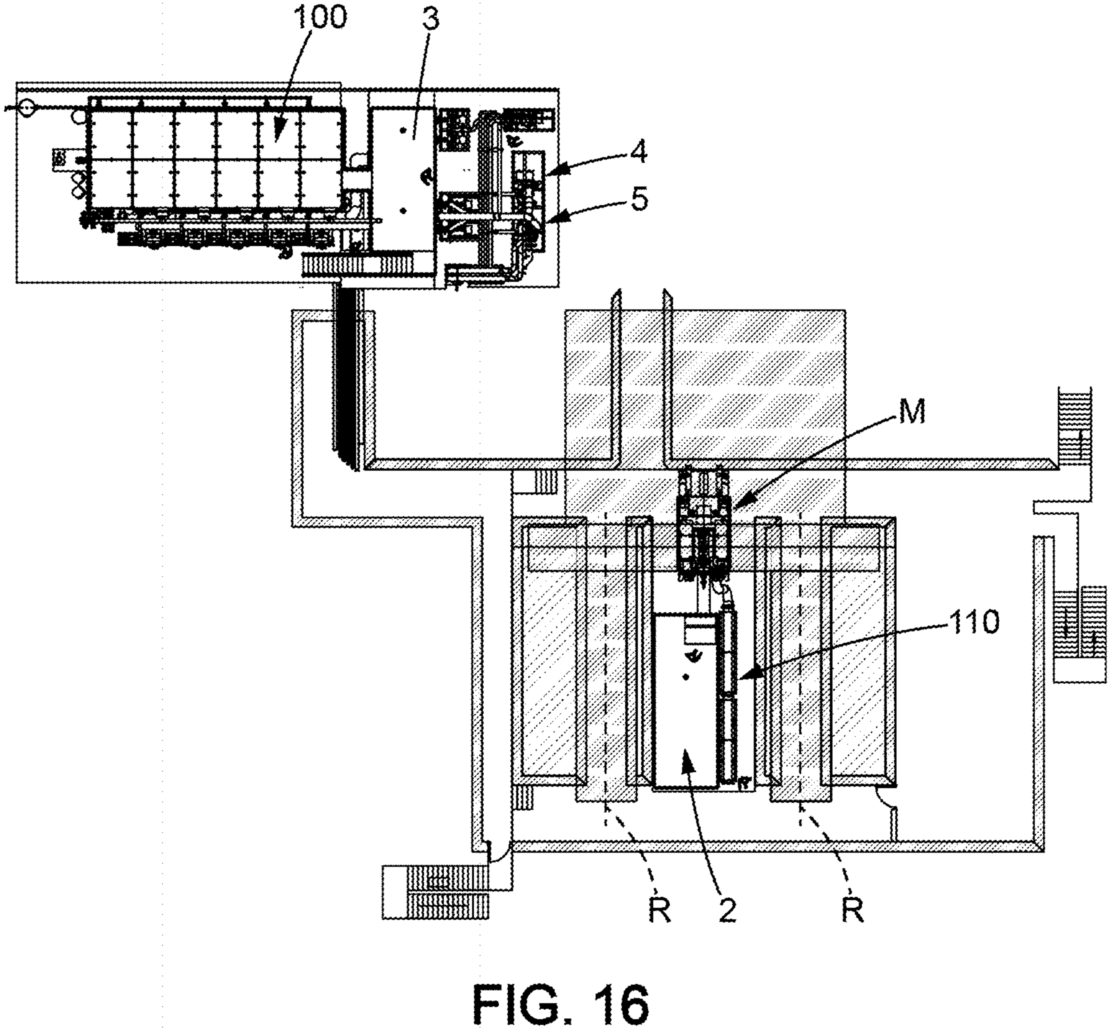
FIG. 16 is a possible arrangement of the filtering and recycling plant according to the present disclosure, with the dirty oil tank being positioned in a vat proximate to the rolling mill, providing access to underneath the stand of the rolling mill.

In FIG. 16, notice that the dirty oil tank 2 could advantageously be positioned in a vat in the immediate vicinity of the rolling mill, providing access to underneath the stand of the rolling mill and while the filtering devices 1 of the primary filtering system, on the one hand, and the decanter 7 and the buffer tank 70 of the secondary separation system, on the other hand, are located at a higher level. This possibility is enabled through a reduction of the size of the dirty oil tank, smaller than 100 $m^3$, in particular smaller than 80 $m^3$, and possibly smaller than 70 $m^3$, through the use of a filtering device having a small number of trays, or else by providing for a number of filtering devices so that the filtering flow rate is always higher than the required nominal flow rate of the rolling mill.

INDUSTRIAL APPLICATION

The recycling and filtering method, as well as the plant, find a particular application for filtering the rolling oil of a 20-high rolling mill used for steel cold rolling.

The present invention finds a particular application for rolling steel strips, with thin thicknesses and having a surface condition with a very low roughness, so-called reflective or ultra-reflective by those skilled in the art, and which requires the use of a high-quality filtered oil.

The invention claimed is:

1. A method for recycling and filtering rolling oil implemented for a rolling mill requiring a rolling oil nominal flow rate comprised between 4000 l/min and 30000 l/min, in an oil recycling and filtering plant having a circuit comprising, successively, according to a direction of oil flow:

- a dirty oil tank, collecting the rolling oils coming from the rolling mill,
- a primary filtering system comprising several oil filtering devices configured to perform filtering of the oil in parallel, each filtering device having a vat receiving a set of filtering cartridges, the vat comprising an inlet for the oil to be filtered and at least one outlet for the filtered oil having passed through a filtering medium of the cartridges,
- a clean oil tank from which the rolling mill is fed with the rolling oil at the nominal flow rate,
- wherein dirty rolling oils loaded with particles are recovered in the dirty oil tank, a primary filtering of the oil of the dirty oil tank is ensured by making the oil circulate in parallel in the filtering devices, and the filtered oil is collected in the clean oil tank,
- wherein back-flushable filtering cartridges are used and an unclogging operation of the cartridges of a filtering device is performed by implementing a fluid countercurrent on said filtering device, while the other filtering devices, disposed in parallel, ensure filtering of the rolling oil, and the unclogging operation generates muds consisting of oil highly loaded with metallic particles,
- wherein the muds generated by the unclogging operation are conveyed to a secondary separation system, ensuring a separation of the oil and of the particles contained in the muds by decantation, thereby obtaining a particle-concentrated mud which is evacuated, and a particle-free oil is sent back to the dirty oil tank,
- wherein the secondary separation system by decantation comprises:
- a buffer tank configured to collect the muds generated by the unclogging operation of primary filtering cartridges,
- a decanter configured to ensure the sedimentation of the particles contained in the muds in a bottom of the decanter, the decanter having an inlet for feeding in the muds and an outlet for the decanted oils,
- a motor-driven regulation device comprising at least one pump configured to feed in, according to a monitored flow rate, a feed-in inlet of the decanter with the muds of the buffer tank,
- and wherein the muds in the decanter are separated into particles which sediment in the bottom of the decanter and into a particle-free oil which is evacuated through the outlet, while ensuring, by said at least one pump, a monitored flow rate of the muds feeding into the decanter so as to guarantee a continuous and turbulence-free decantation in the decanter between said feed-in inlet and said outlet of the decanter, over a duration longer than a duration separating two consecutive unclogging operations of two oil filtering devices of the primary filtering system.

2. The rolling oil recycling and filtering method according to claim 1, wherein said decanter has a useful volume between said feed-in inlet and said outlet, with a capacity V, and wherein a feed-in flow rate D is regulated to obtain an average decantation time, which is equal to the V/D ratio and is longer than 10 hours, between said inlet and said outlet.

3. The rolling oil recycling and filtering method according to claim 1, wherein the decanter comprises one single decantation vat extending lengthwise along a longitudinal direction, and wherein said feed-in inlet for the muds is provided at a proximal end of the longitudinal ends of the decantation vat, and said outlet is provided at a distal end of the longitudinal ends.

4. The rolling oil recycling and filtering method according to claim 3, wherein the decantation vat consists of a vat devoid of any partition transverse to the longitudinal direction between the inlet for the muds and the outlet for the decanted oil.

5. The rolling oil recycling and filtering method according to claim 3, wherein the vat has a V-shaped section, along a plane perpendicular to the longitudinal direction, with two walls inclined towards one another converge towards the bottom of the vat.

6. The recycling method according to claim 3, wherein an immersed motor-driven conveyor is disposed at the bottom of the decantation vat and extends along the longitudinal direction, the conveyor including scrapers configured to scrape the bottom and bring the sediments at the proximal end where the sediments are drawn off.

7. The rolling oil recycling and filtering method according to claim 3, wherein the outlet is a spillway defining the fluid volume in the decantation vat.

8. The rolling oil recycling and filtering method according to claim 1, wherein each of the filtering devices comprises one or several removable tray(s) in an inner volume of the vat, configured to be removed out of the vat through an upper opening closed by one or several cap(s), each tray removably receiving filtering cartridges, each tray being hollow and constituting a collector for the oil filtered by the cartridges of said tray, and each tray comprising a filtered oil outlet removably connected to a corresponding outlet of the vat via a fitting.

9. The method according to claim 8 having one single tray or several trays which are then disposed juxtaposed on one single level in the vat, the cartridges hanging downwards, and configured such that the muds generated by the fluid countercurrent fall directly in the bottom of the vat of the filtering device.

10. The method according to claim 1, wherein the secondary separation system ensuring the separation of the muds into the concentrated mud and into the metallic particle-free oil is devoid of any filtering devices with cartridges so that the secondary separation is obtained only by decantation.

11. The method according to claim 1, wherein, during unclogging of one of the filtering devices, the other filtering devices, disposed in parallel, ensure the filtering of the rolling oil according to a filtering flow rate covering the nominal flow rate of the rolling mill for the rolling operations, the filtered oil flow rate reaching the clean oil tank being always higher than the nominal flow rate that is drawn from the clean oil tank to cool down the rolling mill, even when the filtering flow rate is reduced by one filtering device during unclogging thereof by countercurrent.

12. A plant for recycling and filtering rolling oil having a circuit comprising, successively, according to the flow direction of the oil:

a dirty oil tank, collecting the rolling oils coming from a rolling mill, a primary filtering system comprising several oil filtering devices configured to perform a filtering of the oil in parallel, each filtering device having a vat receiving a set of filtering cartridges, the vat comprising an inlet for the oil to be filtered and at least one outlet for the filtered oil having passed through a filtering medium of the cartridges, the filtering cartridges being back flushable, a clean oil tank, a system for providing an unclogging operation for unclogging the cartridges of the filtering devices, configured to implement a fluid countercurrent; on one of the filtering devices, while the other filtering devices, disposed in parallel, ensure the filtering of the rolling oil, the unclogging operation generating muds consisting of oil highly loaded with metallic particles, a secondary separation system, ensuring a separation by decantation of the oil and of the particles contained in the muds, thereby obtaining a particle-concentrated mud which is evacuated, and a particle-free oil which is sent to the dirty oil tank, wherein the secondary separation system by decantation comprises:

a buffer tank dimensioned so as to collect the muds generated by the unclogging operation of primary filtering cartridges, a decanter configured to ensure the sedimentation of the particles contained in the muds in the bottom of the decanter, the decanter having an inlet for feeding in the muds and an outlet for the decanted oils, a motor-driven regulation device comprising at least one pump configured to feed in, according to a monitored flow rate of the decanter, a feed-in inlet of the decanter with the muds of the buffer tank, and wherein the secondary separation system is configured to separate the muds in the decanter into particles which sediment in the bottom of the decanter and into a particle-free oil while ensuring, by said at least one pump, a monitored flow rate of the muds feeding in the decanter so as to guarantee a continuous and turbulence-free decantation in the decanter over a duration longer than a duration separating two consecutive unclogging operations of two oil filtering devices of the primary filtering system.

13. The plant according to claim 12, wherein the decanter comprises one single decantation vat extending lengthwise along a longitudinal direction and wherein said feed-in inlet for the muds is provided at a proximal end of the longitudinal ends of the decantation vat, and said outlet at a distal end of the longitudinal ends.

14. The plant according to claim 13, wherein the decantation vat is a vat devoid of any partition transverse to the longitudinal direction between the inlet for the muds and the outlet for the decanted oil.

15. The plant according to claim 13, wherein the vat has a V-shaped section, along a plane perpendicular to the longitudinal direction, with two walls inclined towards one another converging towards the bottom of the decantation vat.

16. The plant according to claim 13, wherein an immersed motor-driven conveyor is disposed at the bottom of the decantation vat and extends along the longitudinal direction, the conveyor including scrapers configured to scrape the bottom of the decantation vat and bring the sediments at the proximal end where the sediments are drawn off.

17. The plant according to claim 13, wherein the outlet is a spillway defining the fluid volume in the decantation vat of the decanter.

18. The plant according to claim 13, wherein the vats of the filtering devices are juxtaposed in series above the decantation vat of the decanter along the longitudinal direction of the decantation vat.

19. The plant according to claim 18, wherein the juxtaposed vats of the filtering devices have rectangular sections, according to a horizontal plane, and extend lengthwise according to the direction transverse to the decantation vat of the decanter and widthwise according to the longitudinal direction of the decantation vat of the decanter.

20. The plant according to claim 18, wherein:

the decantation vat of the decanter comprises, along the longitudinal direction of the vat, several vat segments welded to one another, and according to a pitch along the longitudinal direction of the decantation vat corresponding to the dimension of a filtering device along the longitudinal direction, the segments forming the decantation vat of the secondary separation and the filtering devices are respectively positioned in an overlapping arrangement relative to one another according to the longitudinal direction.

21. The plant according to claim 18, wherein the vats of the filtering devices and the buffer tank are contained within the footprint of the decantation vat of the decanter.

22. The plant according to claim 12, wherein each of the filtering devices comprises one or several removable tray(s) in an inner volume of the vat, configured to be removed out of the vat through an upper opening closed by a cap, each tray removably receiving filtering cartridges, each tray being hollow and constituting a collector for the oil filtered by the cartridges of said tray, and each tray comprising a filtered oil outlet removably connected to a corresponding outlet of the vat via a fitting.

23. The plant according to claim 22 having one single tray or several trays which are then disposed juxtaposed on one single level in the vat, the cartridges hanging downwards, and configured such that the muds generated by the fluid countercurrent fall directly in the bottom of the vat of the filtering device.

24. The plant according to claim 23, having several trays juxtaposed on one single level in the vat, wherein the juxtaposed trays are shifted according to the direction transverse to the decantation vat of the decanter.

25. The plant according to claim 12, wherein the vats of the filtering devices ensuring the primary filtering are arranged above the decanter ensuring the secondary separation.

26. The plant according to claim 12, wherein:

the dirty oil tank is positioned in a basement in the immediate vicinity of the rolling mill, providing access to underneath a stand of the rolling mill; and the filtering devices of the primary filtering system, the decanter, and the buffer tank of the secondary separation system are located at a higher level.

* * * * *